(12) United States Patent
Yagi et al.

(10) Patent No.: US 7,673,366 B2
(45) Date of Patent: Mar. 9, 2010

(54) MOTOR APPARATUS

(75) Inventors: Hideyuki Yagi, Toyohashi (JP); Masanori Takeuchi, Nukata-gun (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 1161 days.

(21) Appl. No.: 11/265,146

(22) Filed: Nov. 3, 2005

(65) Prior Publication Data

US 2006/0117514 A1 Jun. 8, 2006

(30) Foreign Application Priority Data

Nov. 26, 2004 (JP) ............... 2004-342182

(51) Int. Cl.
  *B60S 1/24* (2006.01)
(52) U.S. Cl. ...................... 15/250.3; 74/425
(58) Field of Classification Search ............... 15/250.3, 15/250.16, 250.15, 250.31; 74/89.14, 426
See application file for complete search history.

(56) References Cited

U.S. PATENT DOCUMENTS

| | | | |
|---|---|---|---|
| 4,774,423 A | 9/1988 | Karasawa et al. | |
| 4,928,802 A | 5/1990 | Weiss et al. | |
| 4,991,903 A | 2/1991 | Okabe et al. | |
| 5,090,261 A | 2/1992 | Nakatsukasa | |
| 5,212,999 A | 5/1993 | Kitada | |
| 5,566,577 A | 10/1996 | Klar | |
| 5,655,405 A | 8/1997 | Lerouge et al. | |
| 5,848,553 A | 12/1998 | Miyazaki | |
| 5,855,140 A | 1/1999 | Imamura | |
| 5,907,885 A * | 6/1999 | Tilli et al. | 15/250.16 |
| 5,979,256 A | 11/1999 | Kilker et al. | |
| 6,003,193 A | 12/1999 | Rivin et al. | |
| 6,026,536 A | 2/2000 | Miller et al. | |
| 6,070,697 A | 6/2000 | Millard | |
| 6,116,110 A | 9/2000 | Maue et al. | |
| 6,205,612 B1 * | 3/2001 | Tilli et al. | 15/250.16 |
| 6,449,798 B1 | 9/2002 | Rivin et al. | |

(Continued)

FOREIGN PATENT DOCUMENTS

DE 197 56 157 4/1999

(Continued)

OTHER PUBLICATIONS

Office Action dated Dec. 16, 2008 in corresponding EPC Application No. 04 026 322.0 (and English Translation).

(Continued)

*Primary Examiner*—Lee D Wilson
(74) *Attorney, Agent, or Firm*—Posz Law Group, PLC

(57) ABSTRACT

An input disk and a clutch disk are supported by an output shaft in such a manner that the input disk is rotatable relative to the output shaft, and the clutch disk is non-rotatable relative to and is axially movable relative to the output shaft. When a large load torque is exerted about the output shaft, relative rotation between the input disk and the clutch disk occurs. A connecting rod has one end connected to a worm wheel, and is reciprocally swung through rotation of the worm wheel. A rotatable lever has one end, which is connected to the other end of the connecting rod, and has the other end, which is engaged with and is secured integrally with the gear teeth of the input disk.

12 Claims, 21 Drawing Sheets

U.S. PATENT DOCUMENTS

| | | |
|---|---|---|
| 6,493,900 B1 | 12/2002 | Koumo et al. |
| 6,611,987 B1 | 9/2003 | Nakazato et al. |
| 2005/0083193 A1 | 4/2005 | Al-Ali |
| 2005/0097698 A1* | 5/2005 | Yagi et al. ............. 15/250.3 |
| 2005/0097699 A1* | 5/2005 | Yagi et al. ............. 15/250.3 |
| 2006/0059646 A1* | 3/2006 | Bendo ................. 15/250.3 |
| 2006/0101603 A1* | 5/2006 | Yagi ..................... 15/250.3 |
| 2006/0117514 A1* | 6/2006 | Yagi et al. ............. 15/250.3 |

FOREIGN PATENT DOCUMENTS

| | | |
|---|---|---|
| EP | 0 904 983 | 3/1999 |
| GB | 1 580 926 | 12/1980 |
| JP | A-64-044367 | 2/1989 |
| JP | H-5-003654 | 1/1993 |
| JP | A-9-118202 | 5/1997 |
| JP | A-11-348737 | 12/1999 |
| JP | B2-3550049 | 12/2000 |
| JP | A-2001-138873 | 5/2001 |
| WO | WO 98/45149 | 10/1998 |
| WO | WO 99/19184 | 4/1999 |

OTHER PUBLICATIONS

Office Action dated Nov. 2, 2007 in corresponding Chinese Patent Application No. 200410088332.6 (and English Translation).
Office Action dated Dec. 14, 2007 in corresponding European Patent Application No. 04 026 322.0.
Office Action dated Jan. 6, 2009 in related U.S. Appl. No. 10/978,560.
Office Communication dated Feb. 15, 2008 in corresponding European Patent Application No. 05 024 565.3-2424.
Extended Search Report issued from European Patent Office issued on Feb. 20, 2006 for the corresponding European patent application No. 05024565.3-2424 (a copy and English translation thereof).
Office Action dated May 1, 2008 in related U.S. Appl. No. 10/978,561.
Office Action dated Jun. 23, 2008 in related U.S. Appl. No. 10/978,560.
European communication dated Jun. 26, 2007 issued in the related European Application No. 04 026 323.8 (corresponding EP application U.S. Appl. No. 10/978,560).
Chinese Office Action dated Sep. 7, 2007 in corresponding Chinese Patent Application No. 200410092293.7 (and English Translation).
Office Action dated Oct. 28, 2008 in corresponding Japanese patent application No. 2004-232554 (and English translation).
Office Action dated Oct. 21, 2008 in corresponding Japanese patent application No. 2004-232555 (and English translation).
Office Action dated Nov. 10, 2008 in corresponding U.S. Appl. No. 10/978,561.
Office Communication issued from European Patent Office issued on Nov. 22, 2005 for the corresponding European patent application No. 04026322.0-2424 (a copy thereof).
Office Action dated Mar. 3, 2009 in corresponding Japanese patent application No. 2004-342182 (and English translation).
Office Action dated Sep. 11, 2009 in corresponding Chinese Patent Application No. 2005101286702 (and English translation).
Notice of Allowance mailed Oct. 23, 2009 in related U.S. Appl. No. 10/978,561.

* cited by examiner

MOTOR APPARATUS

CROSS REFERENCE TO RELATED APPLICATION

This application is based on and incorporates herein by reference Japanese Patent Application No. 2004-342182 filed on Nov. 26, 2004. This application is also related to U.S. application Ser. No. 10/978,560, entitled "CLUTCH DEVICE, MOTOR APPARATUS AND WIPER SYSTEM," filed on Nov. 2, 2004 and to U.S. application Ser. No. 10/978,561, entitled "OUTPUT SHAFT ASSEMBLY, MOTOR APPARATUS AND WIPER MOTOR APPARATUS," filed on Nov. 2, 2004.

BACKGROUND OF THE INVENTION

1. Field of the Invention

The present invention relates to a motor apparatus.

2. Description of Related Art

In general, a wiper motor apparatus, such as a rear wiper motor apparatus (or simply referred to as a rear wiper motor), has a gear housing, which receives a speed reducing mechanism and a swing mechanism. The swing mechanism converts rotational movement of the motor into reciprocal swing movement to reciprocally rotate an output shaft of the motor.

An example of a rear wiper motor includes a rear wiper motor 200 of FIG. 20 that has a swing mechanism 208. One such wiper motor having the swing mechanism is disclosed in, for example, Japanese Patent No. 3550049. The swing mechanism 208 of FIG. 20 has a reciprocally swingable sector gear 206, which is meshed with a gear 204 that rotates integrally with an output shaft 202 (the gear 204 possibly rotating integrally with the output shaft 202 through a transmission member, such as a clutch), to reciprocally rotate the output shaft 202 through a large angular range (a wide angular range). Also, as shown in FIG. 21, there has been proposed a rear wiper motor 250 that serves as a rear wiper motor of a wide angular range type and includes a swing mechanism 258, in which a reciprocally movable rack 256 is meshed with a gear 254 that is rotated integrally with an output shaft 252.

Furthermore, as shown in FIG. 22, there has been proposed a rear wiper motor 300 that includes a swing mechanism 308, which includes a reciprocally swingable rod 306 connected to a lever 304 that rotates integrally with an output shaft 302. The swing mechanism 308 reciprocally rotates the output shaft 302 through a narrow angular range (not exceeding 180 degrees, and a maximum of 120 degrees). One such rear wiper motor having the swing mechanism of the narrow angular range type is disclosed in, for example, Japanese Patent No. 3180018. The rear wiper motor 300 of the narrow angular range type has a simple structure and can be manufactured at low costs.

In the rear wiper motor of the wide angular range type and the rear wiper motor of the narrow angular range type, some components, such as the output shaft and the wheel gear rotated by the motor main body or the drive force of the motor main body, are basically common to both of these rear wiper motors. However, the swing mechanism, which is located between the wheel gear and the output shaft, differs between the rear wiper motor of the wide angular range type and the rear wiper motor of the narrow angular range type. Specifically, as shown in FIG. 22, in the swing mechanism 308 of the narrow angular range type, one end of the lever 304 is secured to a base end of the output shaft 302, and the other end of the lever 304 is connected to the rod 306, which is, in turn, connected to the wheel gear 310 at an eccentric point. In contrast, as shown in FIG. 20, in the case of the swing mechanism 208 of the wide angular range type, the gear 204 is secured to a base end of the output shaft 202. The gear 204 is meshed with the gear teeth of the sector gear 206, which is connected to the eccentric point of the wheel gear 210. Even in the case of the swing mechanism 258 of the wide angular range type of FIG. 21, the gear 254, which is secured to the output shaft 252, is meshed with the gear teeth of the rack 256 that is connected to the eccentric point of the wheel gear 260. Thus, it is difficult to form the swing mechanism as a common component, which can be commonly used for both of the rear wiper motor of the wide angular range type and the rear wiper motor of the narrow angular range type. As a result, it has been required to manufacture the swing mechanisms for the respective motors of different types.

Particularly, in the case of the rear wiper motor, which has a clutch device installed to an output shaft to protect a swing mechanism and a speed reducing mechanism from an excessively large external force, it is desirable to handle the clutch device as a single component by installing the clutch device to the output shaft. However, in the case where the structure of the swing mechanism of the wide angular range type is different from the structure of the swing mechanism of the narrow angular range type, the components installed to the output shaft are different between these two types. Thus, different output shaft assemblies, which correspond to the different types, need to be formed, and therefore the manufacturing costs could be increased.

SUMMARY OF THE INVENTION

The present invention is made in view of the above facts. Thus, it is an objective of the present invention to provide a motor apparatus, which addresses the above disadvantage and thereby enables minimization of manufacturing costs of the motor apparatus.

To achieve the objective of the present invention, there is provided a motor apparatus, which includes a housing, an output shaft, a gear member, a rotatable body, a motor main body, a connecting rod and a rotatable lever. The output shaft is rotatably supported by the housing. The gear member is supported by the output shaft in such a manner that the gear member is non-rotatable relative to the output shaft about an axis of the output shaft. The gear member has gear teeth along an outer peripheral part of the gear member to receive a drive force. The rotatable body is rotatably supported by the housing. The motor main body provides a rotational drive force for rotating the rotatable body. The connecting rod has one end, which is connected to the rotatable body at a point that is different from a rotational center of the rotatable body. The connecting rod is reciprocally swung through rotation of the rotatable body. The rotatable lever has one end, which is connected to the other end of the connecting rod, and has the other end, which is engaged with and is secured integrally with the gear teeth of the gear member. The rotatable lever reciprocally rotates the gear member about the axis of the output shaft through reciprocal swing movement of the connecting rod.

To achieve the objective of the present invention, there is also provided a motor apparatus, which includes a housing, an output shaft, a clutch device, a rotatable body, a motor main body, a connecting rod and a rotatable lever. The output shaft is rotatably supported by the housing. The clutch device includes a gear member and a clutch disk. The gear member is supported by the output shaft in such a manner that the gear member is rotatable relative to the output shaft about an axis of the output shaft. The gear member has gear teeth along an outer peripheral part of the gear member to receive a drive force. The clutch disk is supported by the output shaft in such a manner that the clutch disk is non-rotatable relative to the output shaft about the axis of the output shaft. The clutch disk is opposed to the gear member in an axial direction of the output shaft and is connected to the gear member in a manner that enables transmission of a drive force therebetween. When a load torque equal to or greater than a predetermined value is exerted about the axis of the output shaft, relative rotation between the gear member and the clutch disk occurs. The rotatable body is rotatably supported by the housing. The motor main body provides a rotational drive force for rotating the rotatable body. The connecting rod has one end, which is connected to the rotatable body at a point that is different from a rotational center of the rotatable body. The connecting rod is reciprocally swung through rotation of the rotatable body. The rotatable lever has one end, which is connected to the other end of the connecting rod, and has the other end, which is directly or indirectly engaged with and is secured integrally with the gear teeth of the gear member. The rotatable lever reciprocally rotates the gear member about the axis of the output shaft through reciprocal swing movement of the connecting rod.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
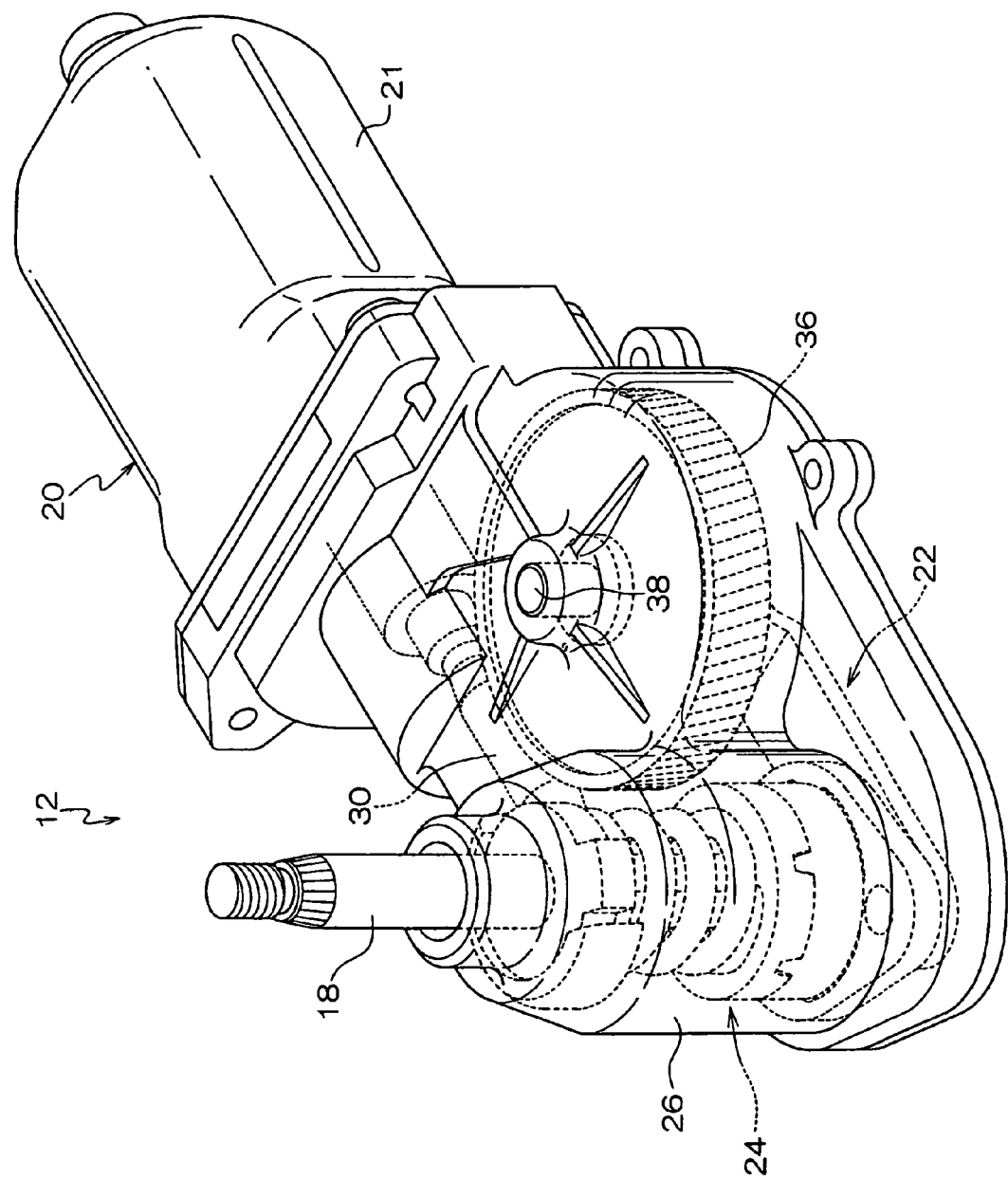
FIG. 1 is a perspective view showing a structure of a motor apparatus according to an embodiment of the present invention.
Figure 2:
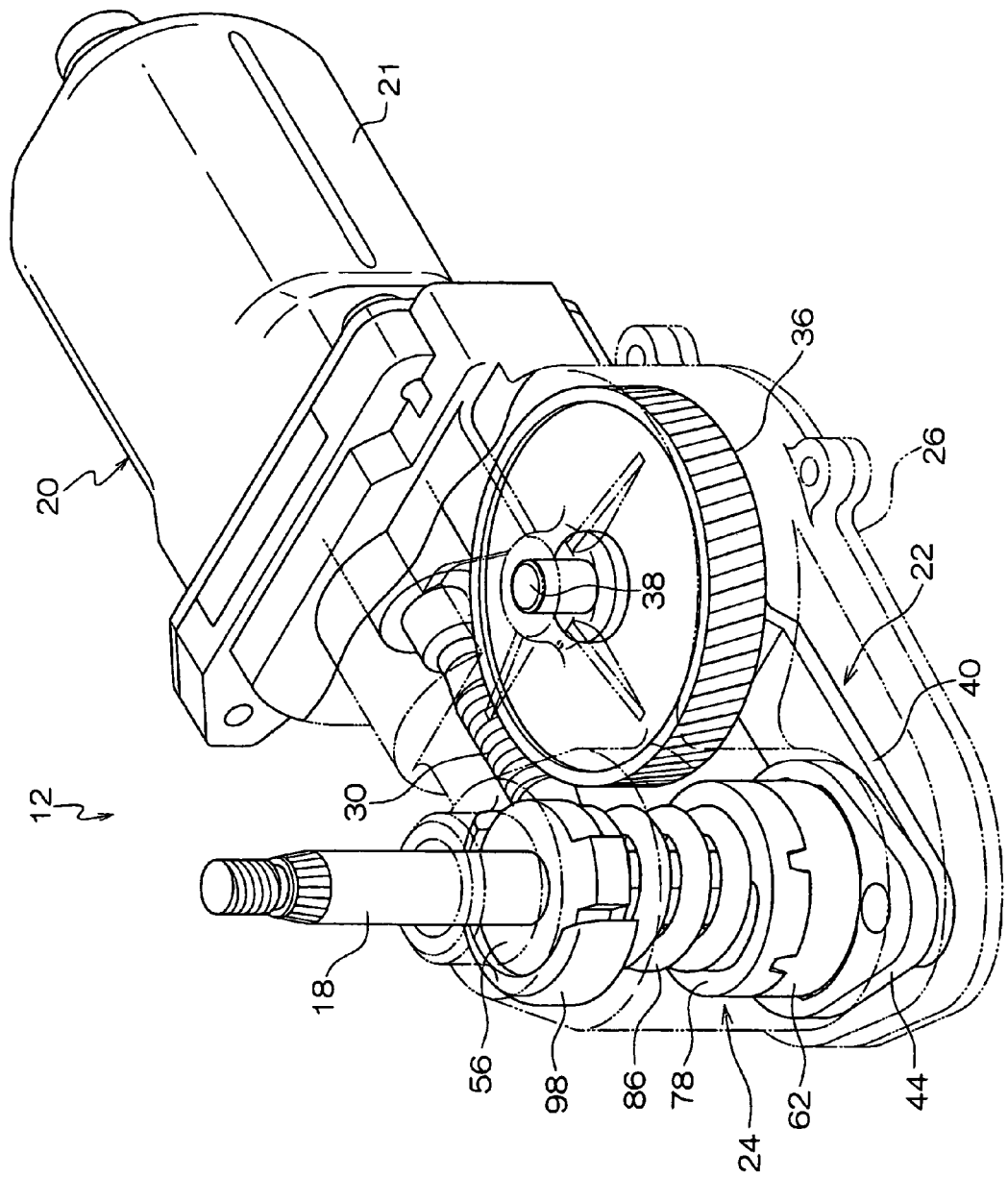
FIG. 2 is a perspective view showing the structure of the motor apparatus of the embodiment in such a manner a portion of the structure of the motor apparatus is made transparent.
Figure 3:
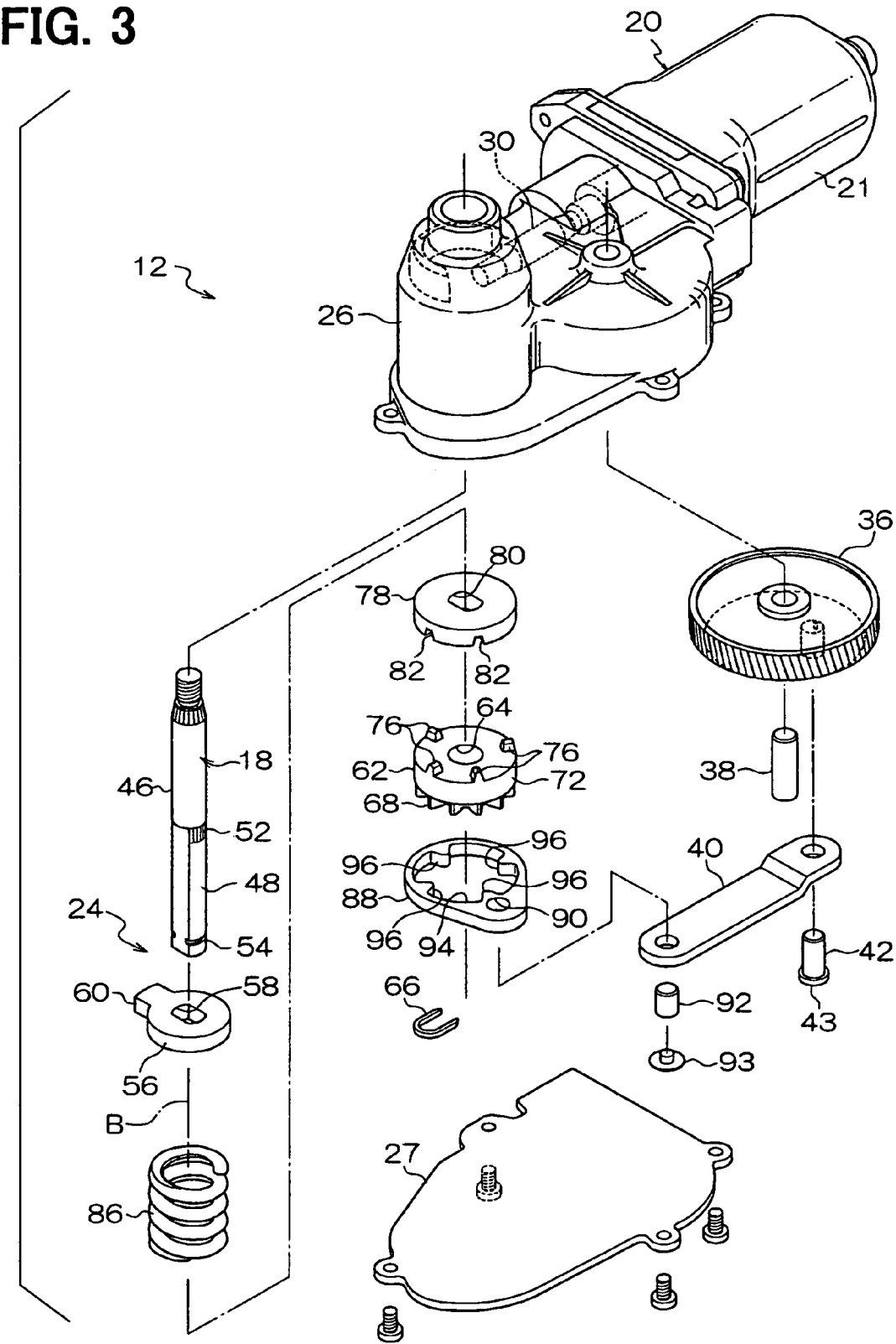
FIG. 3 is an exploded perspective view showing the structure of the motor apparatus of the embodiment of the present invention.
Figure 4:
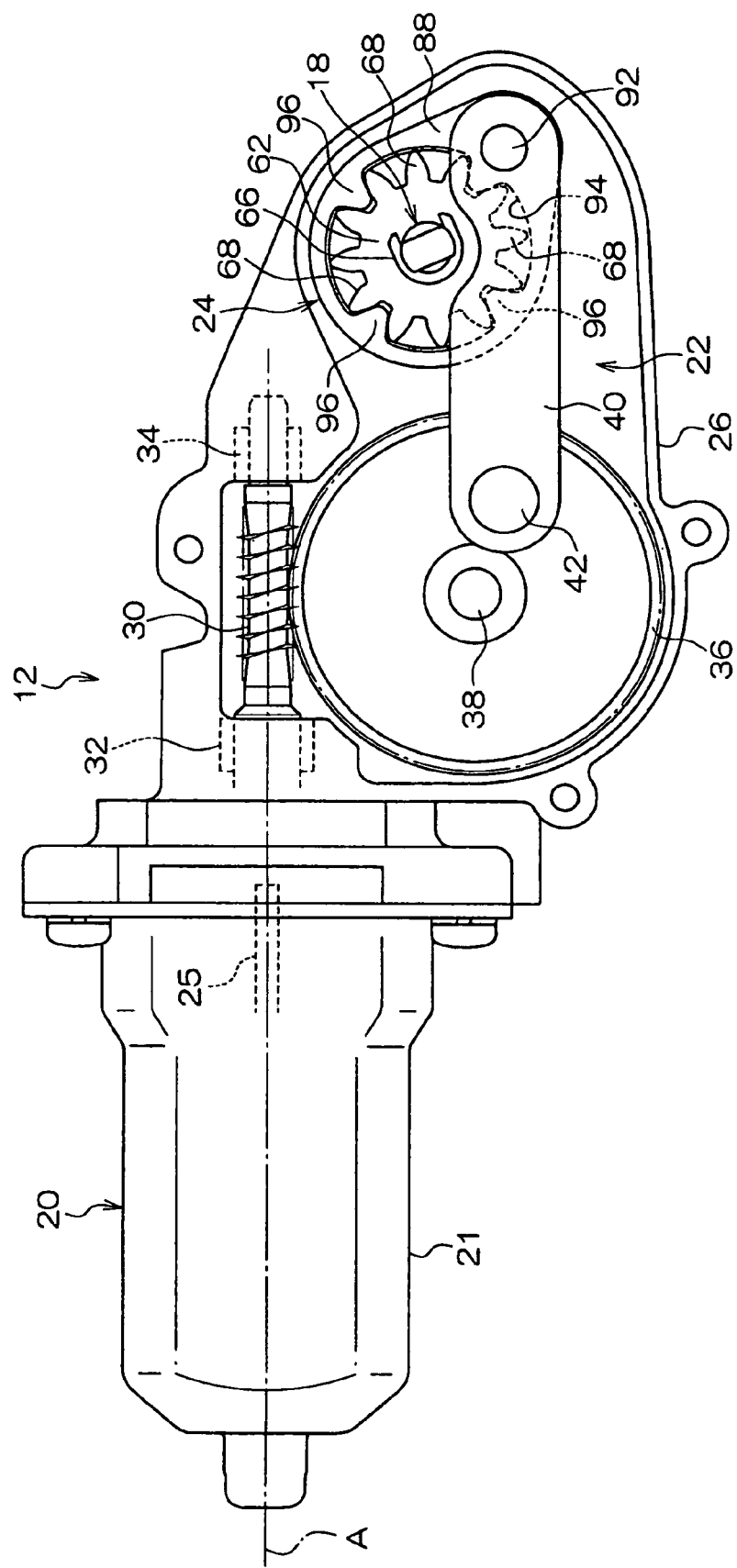
FIG. 4 is a rear view showing the structure of the motor apparatus of the embodiment of the present invention.
Figure 5:
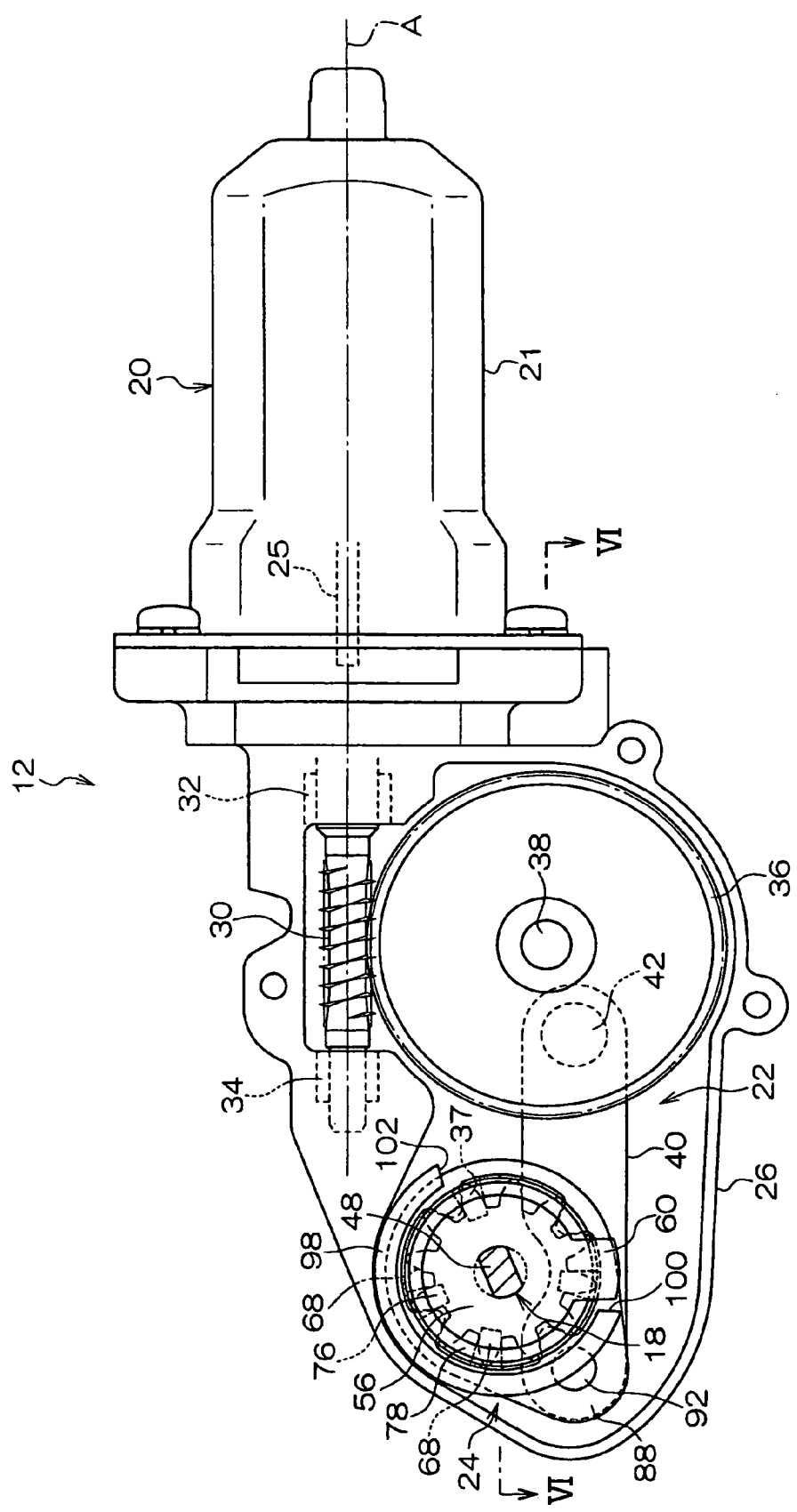
FIG. 5 is a planar cross sectional view showing the structure of the motor apparatus of the embodiment of the present invention.

A wiper motor 12, which serves as a motor apparatus of an embodiment of the present invention, will be described with reference to FIGS. 1 to 16. As shown in FIGS. 1 and 2, the wiper motor 12 includes a motor main body 20, a swing mechanism 22 and a clutch device 24. The motor main body 20 has a yoke housing 21, which is formed through a drawing process and is shaped into a cylindrical body having a bottom at one axial end (the right end in FIG. 1 or 2). The yoke housing 21 is formed into a generally flat body, which has an elongated cross section in a plane that extends in a direction perpendicular to a rotatable shaft 25 (FIG. 5) of the motor main body 20. A transverse direction of the elongate cross section of the yoke housing 21 is parallel to an axial direction of an output shaft 18 of the wiper motor 12 (a direction perpendicular to a plane of FIG. 4). An open end of the yoke housing 21 is connected integrally to a housing 26, which forms a part of a main body of the wiper motor 12. In FIG. 4, a cover 27, which closes a rear side of the housing 26 is not depicted for the sake of simplicity. A worm gear 30 of the swing mechanism 22, which is arranged in the housing 26, is connected to the rotatable shaft 25 of the motor main body 20 through, for example, a coupling.

One end of the worm gear 30 is rotatably supported by the housing 26 through a bearing 32, and the other end of the worm gear 30 is rotatably supported by the housing 26 through a bearing 34 (FIG. 4). The worm gear 30 is meshed with a worm wheel 36, which serves as a rotatable member (a rotatable body).

The worm wheel 36 is arranged on one side (the lower side in FIG. 4) of an axis A of the worm gear 30 and is received in the housing 26 in such a manner that the worm wheel 36 is meshed with the worm gear 30. When the worm gear 30 is rotated by the motor main body 20 through the rotatable shaft 25, the worm wheel 36 is rotated at a reduced speed around a rotatable shaft 38, which extends in a direction perpendicular to the axis A of the worm gear 30 (the rotatable shaft 25).

Figure 6:
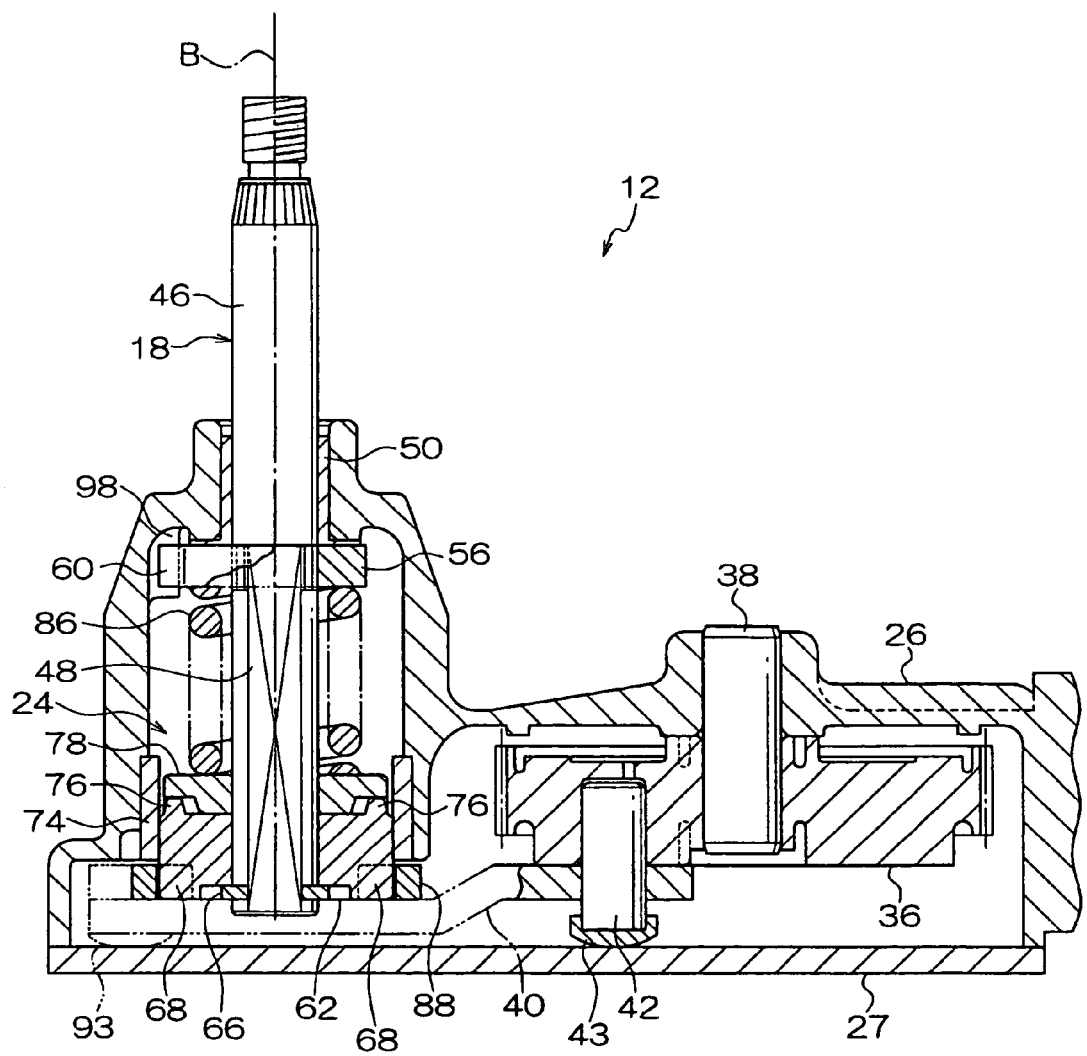
FIG. 6 is a cross sectional view taken along line VI-VI in FIG. 5, showing the structure of the motor apparatus of the embodiment of the present invention.
Figure 7:
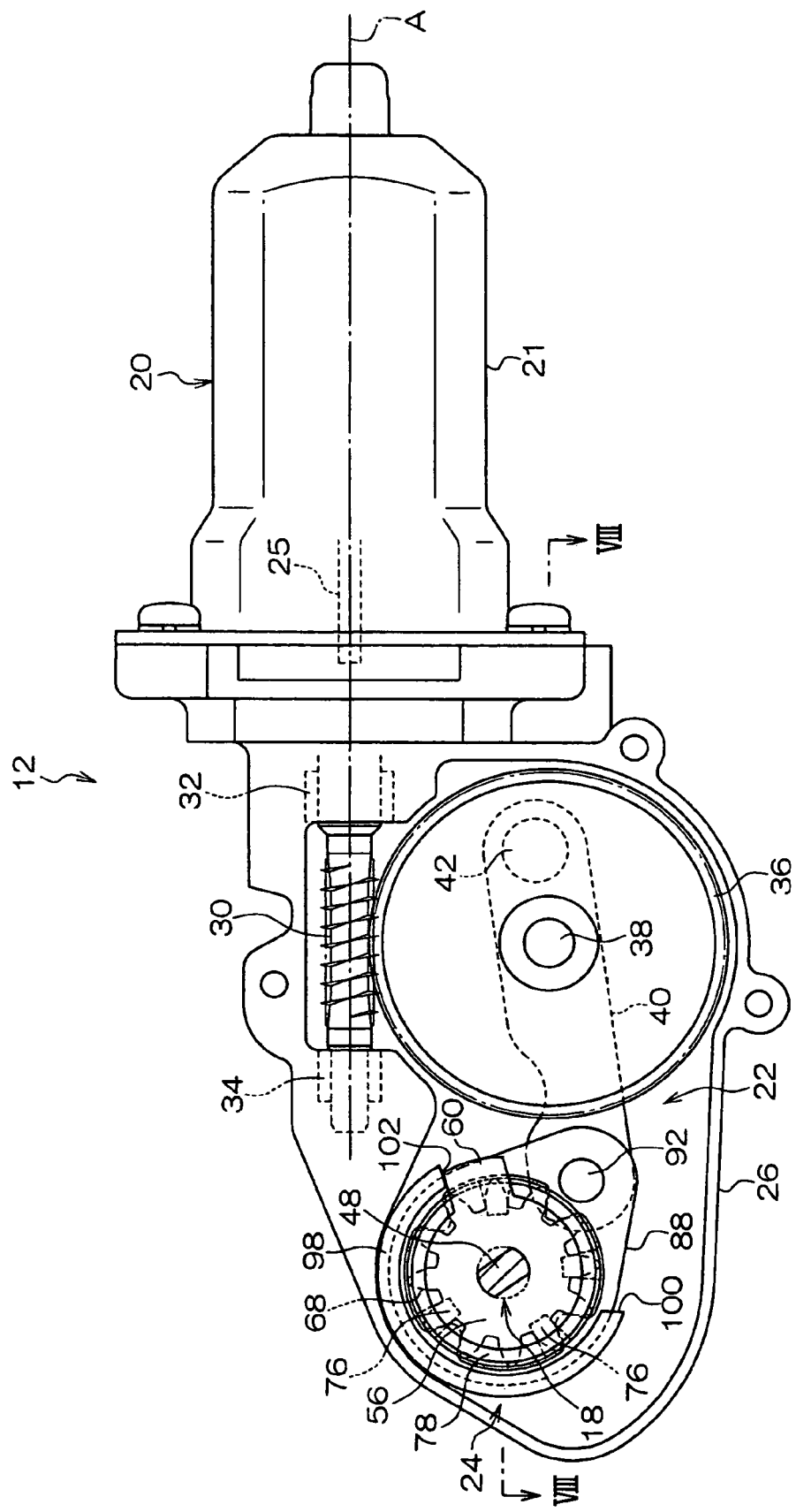
FIG. 7 is a planar cross sectional view showing the structure of the motor apparatus of the embodiment of the present invention.

A connecting rod 40, which forms a part of the swing mechanism 22, is connected to the worm wheel 36. One end of the connecting rod 40 is rotatably connected to the worm wheel 36 through a support shaft (a crank pin) 42, which is provided at a point (a radially displaced point) that is different from the rotatable shaft 38 (a rotational center) of the worm wheel 36. As shown in FIG. 6, a sliding member 43, which is made of a resin material, is connected to one axial end (a lower end in FIG. 6) of the support shaft 42. The sliding member 43 is slidably engaged with the cover 27. The other end of the connecting rod 40 is rotatably connected to one end of a rotatable lever 88, which will be described below.

Figure 10:
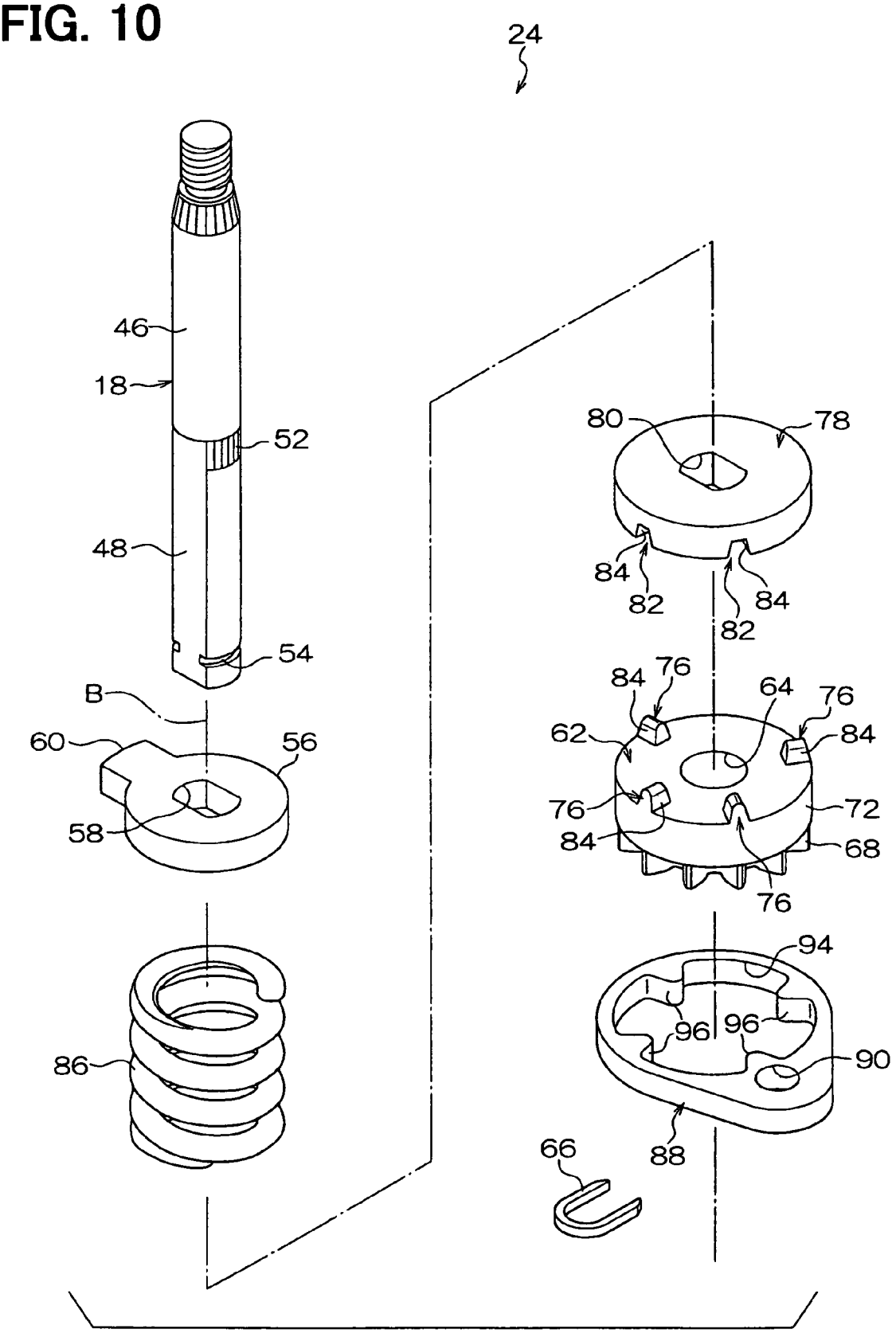
FIG. 10 is an exploded perspective view showing the structure of a clutch device, which is a constituent member of the motor apparatus of the embodiment of the present invention.
Figure 11:
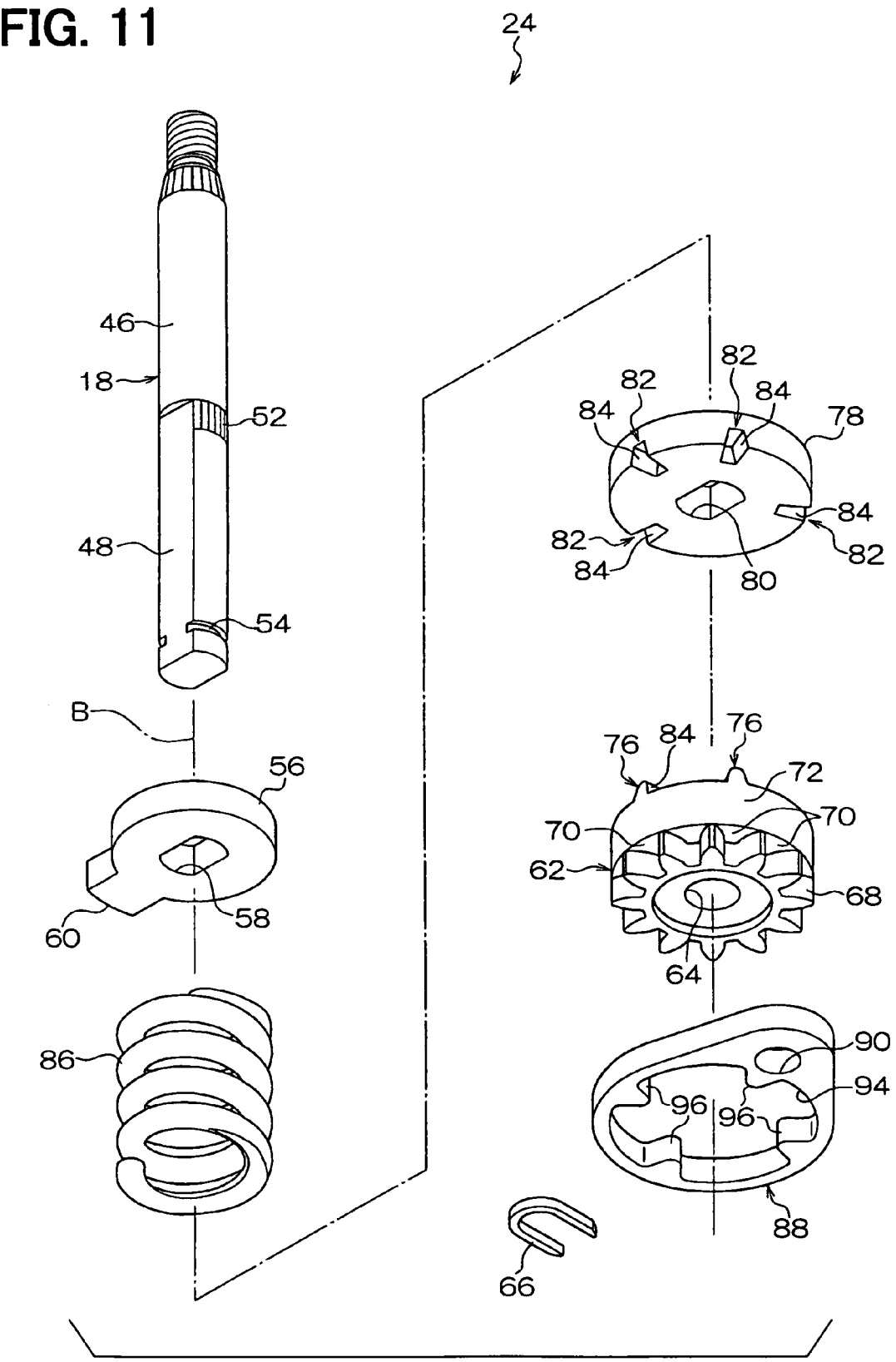
FIG. 11 is an exploded perspective view showing the structure of the clutch device, which is the constituent member of the motor apparatus of the embodiment of the present invention.

As shown in FIGS. 10 and 11, a distal end side (an upper side in FIGS. 10 and 11) of the output shaft 18 is formed as a cylindrical portion 46 that has a circular cross section. Furthermore, a proximal end side (a lower side in FIGS. 10 and 11) of the output shaft 18 is formed as a relative rotation limiting portion 48 that has a generally rectangular cross section (having a double-D cross section that is defined by two diametrically opposed flat surfaces and two arcuate surfaces, each of which connects between the two flat surfaces).

Figure 8:
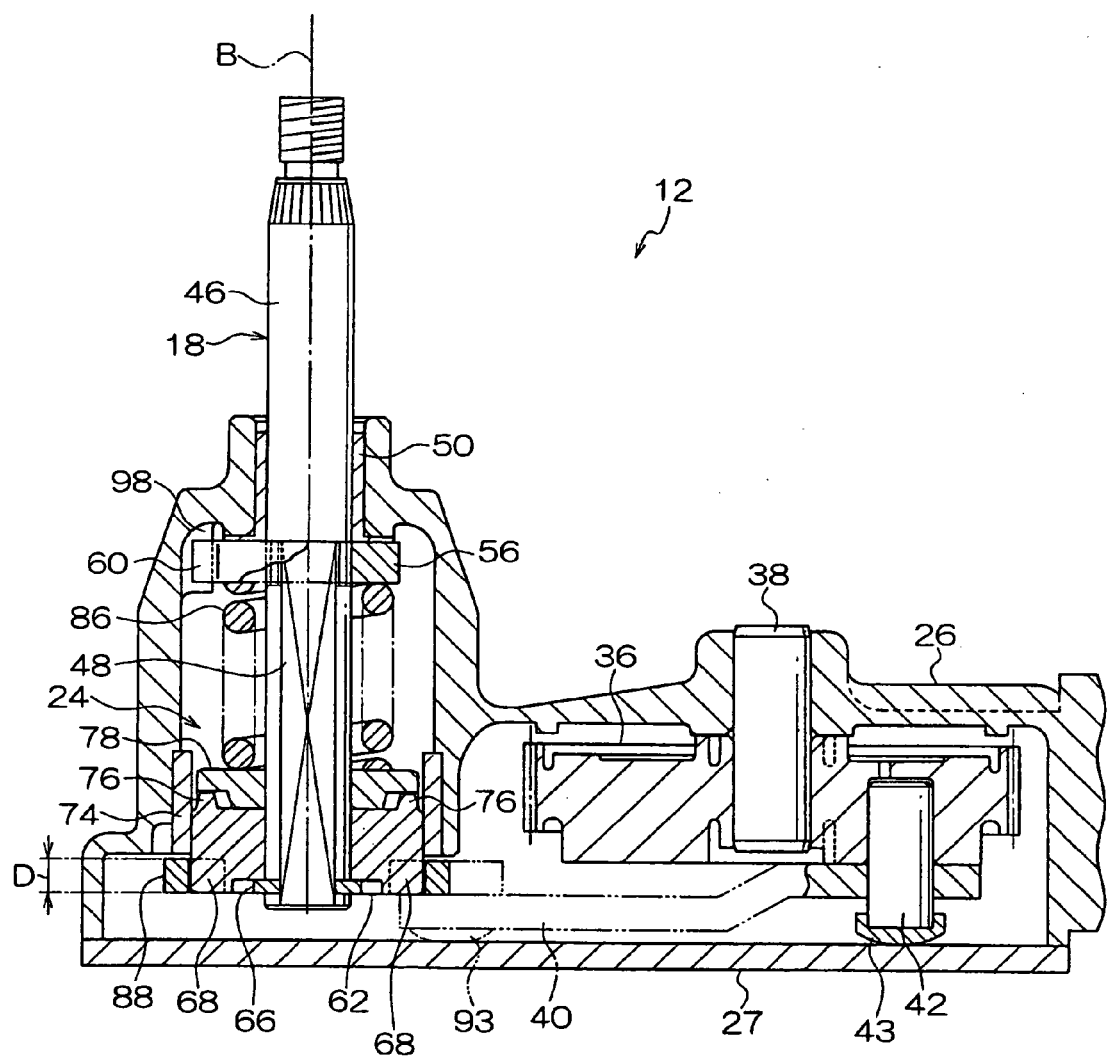
FIG. 8 is a cross sectional view taken along line VIII-VIII in FIG. 7, showing the structure of the motor apparatus of the embodiment of the present invention.

As shown in FIGS. 6 and 8, the cylindrical portion 46 of the output shaft 18 is rotatably supported by a bearing 50, which is secured to the housing 26. A rotation restraining portion 52 is formed at a distal end side (a cylindrical portion 46 side) of the relative rotation limiting portion 48. In the rotation restraining portion 52, a plurality of ridges extends in a direction of an axis B in each of the arcuate surfaces of the relative rotation limiting portion 48.

A generally disk shaped engaging base 56, which forms a part of the clutch device 24, is securely connected to the rotation restraining portion 52 of the relative rotation limiting portion 48 in such a manner that the engaging base 56 is coaxial with the output shaft 18. A support hole 58 is formed in a center of the engaging base 56. The support hole 58 has a generally rectangular cross section (a double-D shaped cross section) that corresponds to the cross section of the relative rotation limiting portion 48 of the output shaft 18. When the support hole 58 is securely connected to the rotation restraining portion 52, the engaging base 56 can be rotated integrally with the output shaft 18 (the engaging base 56 being nonmovable relative to the output shaft 18 in the direction of the axis B upon installation of the engaging base 56 to the output shaft 18). A stopper portion 60 is formed in an outer peripheral edge of the engaging base 56 and protrudes in a radial direction (a radial direction of the output shaft 18). The stopper portion 60 corresponds to a stopper projection 98 (FIG. 2), which is formed in the housing 26 and will be described latter.

In the present embodiment, the output shaft 18 and the engaging base 56 are formed separately and are then securely connected together. However, the present invention is not limited to this. For example, the output shaft 18 and the engaging base 56 may be formed integrally into a corresponding structure (e.g., a structure, in which a flange shaped large diameter portion corresponding to the engaging base 56 is formed integrally in the output shaft), through, for example, a cold forging process.

An input disk 62, which serves as a gear member that forms a part of the clutch device 24, is coaxially installed to a removal limiting portion 54 of the relative rotation limiting portion 48. The input disk 62 is formed into a cylindrical body, in which a shaft hole 64 of a circular cross section is formed in its center. When the removal limiting portion 54 of the output shaft 18 is inserted through the shaft hole 64 of the input disk 62, and a removal limiting clip 66 is installed to an end of the removal limiting portion 54, removal of the input disk 62 from the removal limiting portion 54 is limited. In this way, the input disk 62 is rotatably supported about the output shaft 18 and is limited from removal from the output shaft 18 in the direction of the axis B on one axial side (an opposite axial side that is opposite from the engaging base 56). The input disk 62 is formed from sintered metal, into which lubricant oil is impregnated. The sintered metal is formed through a powder metallurgy process. More specifically, powder alloy is placed into a corresponding die and is compression molded, and thereafter the compression molded product is heated and is sintered to form the input disk 62.

Gear teeth 68 are arranged one after another along an outer peripheral part of one axial end of the input disk 62, which is opposite from the engaging base 56 in the direction of the axis B. The gear teeth 68 correspond to the rotatable lever 88, which will be described latter. Furthermore, as shown in FIG. 11, a connecting wall 70 is formed at the other axial end side (the engaging base 56 side) of the gear teeth 68 to connect one axial ends of the gear teeth 68.

Furthermore, a cylindrical peripheral surface 72, which is coaxial with the output shaft 18, is formed in an outer peripheral part of the input disk 62 on an opposite axial side of the connecting wall 70, which is opposite from the gear teeth 68. As shown in FIGS. 6 and 8, the cylindrical peripheral surface 72 is rotatably held (i.e., supported) by a bearing 74, which is secured to the housing 26. Specifically, the input disk 62 has an annular flange, which is located on the other axial end side of the gear teeth 68 in the direction of the axis B and which is coaxial with the output shaft 18. An outer peripheral surface (a cylindrical peripheral surface 72) of the annular flange is supported by the bearing 74.

Four engaging projections 76 are provided in an end surface, which is located in the other axial end side (the engaging base 56 side) of the input disk 62 in the direction of the axis B. The engaging projections 76 are arranged along an outer peripheral edge of the end surface of the input disk 62 and axially project toward the engaging base 56. The engaging projections 76 are arranged coaxial to the input disk 62 and are spaced one after another in a circumferential direction of the input disk 62 at unequal intervals (each interval between corresponding two of the engaging projections 76 being different from any of its circumferentially adjacent intervals). The engaging projections 76 correspond to a clutch disk 78, which forms a part of the clutch device 24.

The clutch disk 78 is formed into a circular disk shape and is supported by the relative rotation limiting portion 48 of the output shaft 18 between the engaging base 56 and the input disk 62 in a coaxial manner with respect to the output shaft 18. A shaft hole 80 is formed in a center of the clutch disk 78. The shaft hole 80 has a generally rectangular cross section (a double-D shaped cross section) that corresponds to the cross section of the relative rotation limiting portion 48. When the output shaft 18 (the relative rotation limiting portion 48) is inserted into the shaft hole 80, the clutch disk 78 is located on the other axial side (the engaging base 56 side) of the input disk 62 in the direction of the axis B. The clutch disk 78 is supported in such a manner that the clutch disk 78 is non-rotatable about the axis B and is axially movable in the direction of the axis B with respect to the output shaft 18. In this way, the clutch disk 78 is rotated always with the output shaft 18 and is relatively movable with respect to the input disk 62 in the direction of the axis B of the output shaft 18. In the present embodiment, the clutch disk 78 is the sintered metal, which is formed through the powder metallurgy process described above and is impregnated with the lubricant oil.

Four engaging recesses 82 are recessed along an outer peripheral edge in a rear end surface of the clutch disk 78 (an end surface at one end of the clutch disk 78 in the direction of the axis B of the output shaft 18). The engaging recesses 82 correspond to the four engaging projections 76, respectively, of the input disk 62 and are arranged coaxial to the clutch disk 78. The engaging recesses 82 are spaced one after another in a circumferential direction of the clutch disk 78 at unequal intervals (each interval between corresponding two of the engaging recesses 82 being different from any of its circumferentially adjacent intervals).

The four engaging projections 76 of the input disk 62 can be fitted into the four engaging recesses 82, respectively. Each engaging projection 76 engages the corresponding engaging recess 82 in the circumferential direction of the output shaft 18. In other words, the clutch disk 78 can be meshed with the input disk 62. In this way, in the normal operational state (rotational state), when the input disk 62 is rotated, the rotational force of the input disk 62 is transmitted to the clutch disk 78. Thus, the clutch disk 78 is rotated together with the input disk 62.

However, as discussed above, the engaging projections 76 and the engaging recesses 82 are arranged at unequal intervals (each interval being different from any of its circumferentially adjacent intervals) in the circumferential direction of the input disk 62 and of the clutch disk 78. Thus, the clutch disk 78 (the output shaft 18) and the input disk 62 can be meshed with each other only when a relative position of the clutch disk 78 (the output shaft 18) and the input disk 62 is in a single predetermined circumferential position. That is, at a position other than the above-described predetermined circumferential position, even when one of the engaging projections 76 is opposed to the corresponding one of the engaging recesses 82, the remaining three engaging projections 76 are not opposed to the remaining three engaging recesses 82. Thus, in the state where the engaging projections 76 are removed from the engaging recesses 82, the clutch disk 78 contacts the input disk 62 through at least three of the engaging projections 76.

Here, all the lateral walls of the engaging projections 76 of the input disk 62 and the lateral walls of the engaging recesses 82 of the clutch disk 78 form circumferentially slanted force component generating surfaces 84, which are slanted in the circumferential direction of the output shaft 18. In other words, each of the engaging projections 76 and the engaging recesses 82 has a corresponding trapezoidal cross section. With this construction, when the input disk 62 is rotated, the rotational force is transmitted from the input disk 62 to the clutch disk 78, and therefore a force component is generated in the clutch disk 78 in the direction of the axis B of the output shaft 18 toward the engaging base 56.

In some cases, it is not necessary to provide the force component generating surface 84 in all of the lateral walls of the engaging projections 76 of the input disk 62 and the lateral walls of the engaging recesses 82 of the clutch disk 78. In other words, the force component generating surface 84, which is slated in the circumferential direction of the output shaft 18, may be provided in at least one of the two lateral walls of each of the engaging projections 76 and the engaging recesses 82. Even in this case, when the rotational force is transmitted from the input disk 62 to the clutch disk 78, the force component can be generated in the clutch disk 78 in the direction of the axis B of the output shaft 18. Furthermore, in some cases, a slant angle of one of the two force component generating surfaces 84 of each of the engaging projections 76 and the engaging recesses 82 may be changed from a slant angle of the other one of the two force component generating surfaces 84. In this way, a clutch release force or declutching force (a force required to release the engagement between the engaging projections 76 and the engaging recesses 82) can be set to different values for an open wiping movement and a closed wiping movement, respectively. Here, in the open wiping movement, a wiper 16, which is connected to the output shaft 18, is swung from a lower turning position to an upper turning position. In the closed wiping movement, the wiper 16 is swung from the upper turning position to the lower turning position.

Furthermore, a coil spring 86, which serves as a resilient member that forms a part of the clutch device 24, is arranged between the clutch disk 78 and the engaging base 56. The coil spring 86 is helically wound around the output shaft 18 and is compressible in the direction of the axis B of the output shaft 18. The coil spring 86 applies a predetermined resistive force (a restoring force that is exerted upon resilient deformation of the coil spring 86, which is caused by axial movement of the clutch disk 78) against axial movement of the clutch disk 78 in the direction of the axis B of the output shaft 18 toward the other axial end side (the engaging base 56 side) from the engaged state where the engaging recesses 82 of the clutch disk 78 are engaged with the engaging projections 76 of the input disk 62.

In other words, normally, once the engaging projections 76 of the input disk 62 are fitted into the engaging recesses 82 of the clutch disk 78, the coil spring 86 maintains this engaged state. When the clutch disk 78 tries to move in the axial direction toward the engaging base 56 to release the engagement between the engaging projections 76 of the input disk 62 and the engaging recesses 82 of the clutch disk 78, the coil spring 86 exerts the urging force (the restoring force) that resists or limits this axial movement of the clutch disk 78.

The urging force (the restoring force) of the coil spring 86 is set as follows. That is, as discussed above, when the engaging projections 76 of the input disk 62 are fitted into the engaging recesses 82 of the clutch disk 78, the rotational force of the input disk 62 is transmitted to the clutch disk 78. However, even in the disengaged state where the engaging projections 76 of the input disk 62 are removed from the engaging recesses 82 of the clutch disk 78, i.e., in the state where the clutch disk 78 is moved toward the engaging base 56, the urging force (the restoring force), which is exerted by the coil spring 86, causes generation of a predetermined frictional force between the engaging projections 76 of the input disk 62 and the rear end surface of the clutch disk 78 to thereby cause integral rotation of the input disk 62 and the clutch disk 78.

In some cases, the coil spring 86 may be constructed to receive the urging force between the engaging base 56 and the clutch disk 78 in the normal state, i.e., in the state where the clutch disk 78 is not try to move toward the engaging base 56. In other cases, the coil spring 86 may be constructed to exert the urging force (the restoring force) against the clutch disk 78 only at the time of the axial movement of the clutch disk 78 toward the engaging base 56 from the engaged state of the clutch disk 78 (at the time when the engaging projections 76 try to move away from the engaging recesses 82).

The rotatable lever 88, which forms a part of the swing mechanism 22, is secured to the input disk 62. The rotatable lever 88 is formed into a generally teardrop-shaped ring through a press working process of a plate material, such as a metal plate material. As shown in FIG. 8, a thickness D (a dimension measured in the direction of the axis B of the output shaft 18) of the rotatable lever 88 is set to be substantially the same as a width (a dimension measured in the direction of the axis B of the output shaft 18) of the gear teeth 68 of the input disk 62.

A shaft hole 90, which has a circular cross section, penetrates through one end (a pointed end or a narrower end of the teardrop shape) of the rotatable lever 88 in the thickness direction (the direction of the axis B of the output shaft 18) of the rotatable lever 88. As shown in FIG. 4, a support shaft 92 is inserted into the shaft hole 90. The other end of the connecting rod 40 is rotatably connected to the shaft hole 90 through the support shaft 92. As shown in FIG. 6, a sliding member 93, which is made of a resin material, is connected to one axial end (a lower end in FIG. 6) of the support shaft 92. The sliding member 93 is slidably engaged with the cover 27.

A receiving portion 94, which has a generally circular cross section, is formed to penetrate through the center of the other end of the rotatable lever 88 in the thickness direction (the direction of the axis B). The receiving portion 94 receives the gear teeth 68 of the input disk 62, more specifically, an outer peripheral part of the gear teeth 68 of the input disk 62 (the one axial end of the input disk 62 in the direction of the axis B of the input disk 62).

Figure 12:
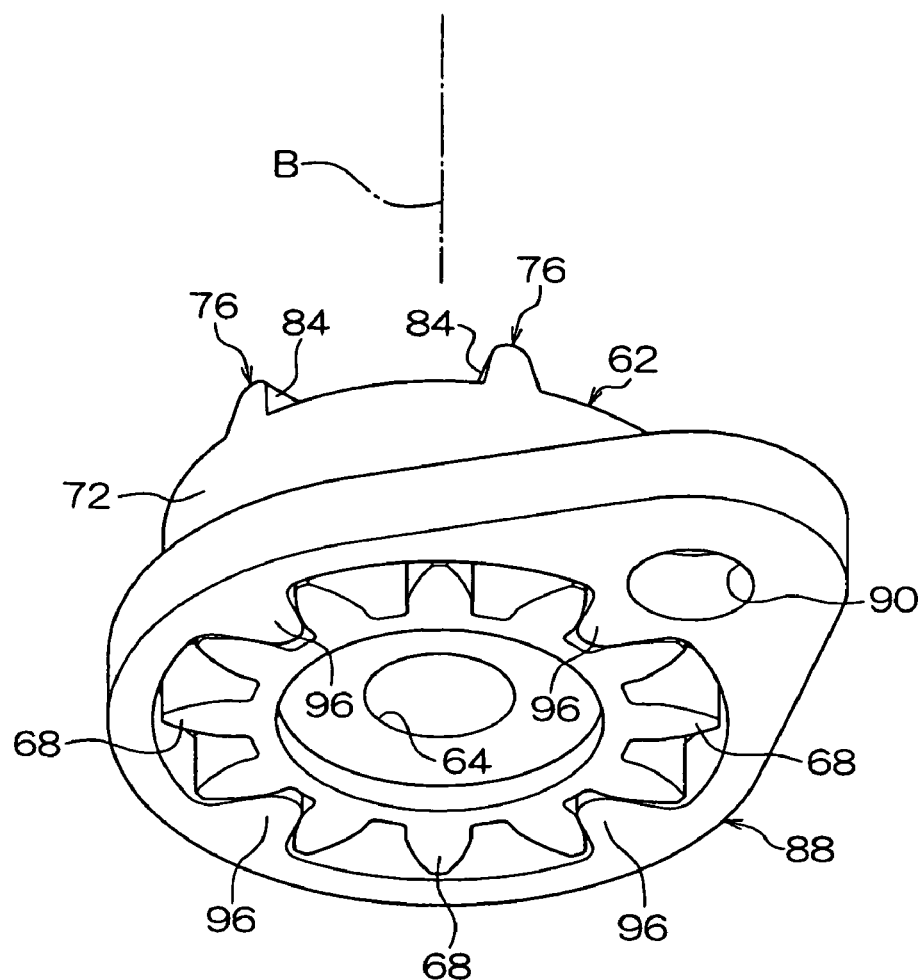
FIG. 12 is a perspective view showing structures of a gear member and of a rotatable lever, which are constituent members of the motor apparatus of the embodiment of the present invention.

As shown in FIG. 12, a plurality (four in the present embodiment) of generally triangular-shaped mating protrusions 96, which mate with the gear teeth 68 of the input disk 62, is formed in an inner peripheral surface of the receiving portion 94 to protrude radially inward of the receiving portion 94. The four mating protrusions 96 are arranged at generally equal intervals in the circumferential direction of the input disk 62 (the output shaft 18). Specifically, two of the mating protrusions 96 are point symmetric to one another with respect to a rotational center (the axis B of the output shaft 18) of the input disk 62, and the other two of the mating protrusions 96 are point symmetric to one another with respect to the rotational center of the input disk 62.

The four mating protrusions 96 are press fitted against the gear teeth 68 of the input disk 62 along a pitch circle of the gear teeth 68 of the input disk 62 in such a manner that each of the four mating protrusions 96 is received in a corresponding trough formed between adjacent two of the gear teeth 68. With this construction, the rotatable lever 88 is secured integrally to the input disk 62.

The rotatable lever 88 is limited from moving toward the other axial side (the clutch disk 78 side) along the axis B of the input disk 62 due to interference (abutment) between the connecting wall 70 of the input disk 62 and each mating protrusion 96. However, in a case where the rotatable lever 88 is constructed in such a manner that the rotatable lever 88 is also limited from moving toward the one axial side, i.e., in a case where the rotatable lever 88 is limited from detaching away from the input disk 62 in the direction of the axis B, it is not required to press fit each mating protrusion 96 against the corresponding gear teeth 68 of the input disk 62.

Figure 13:
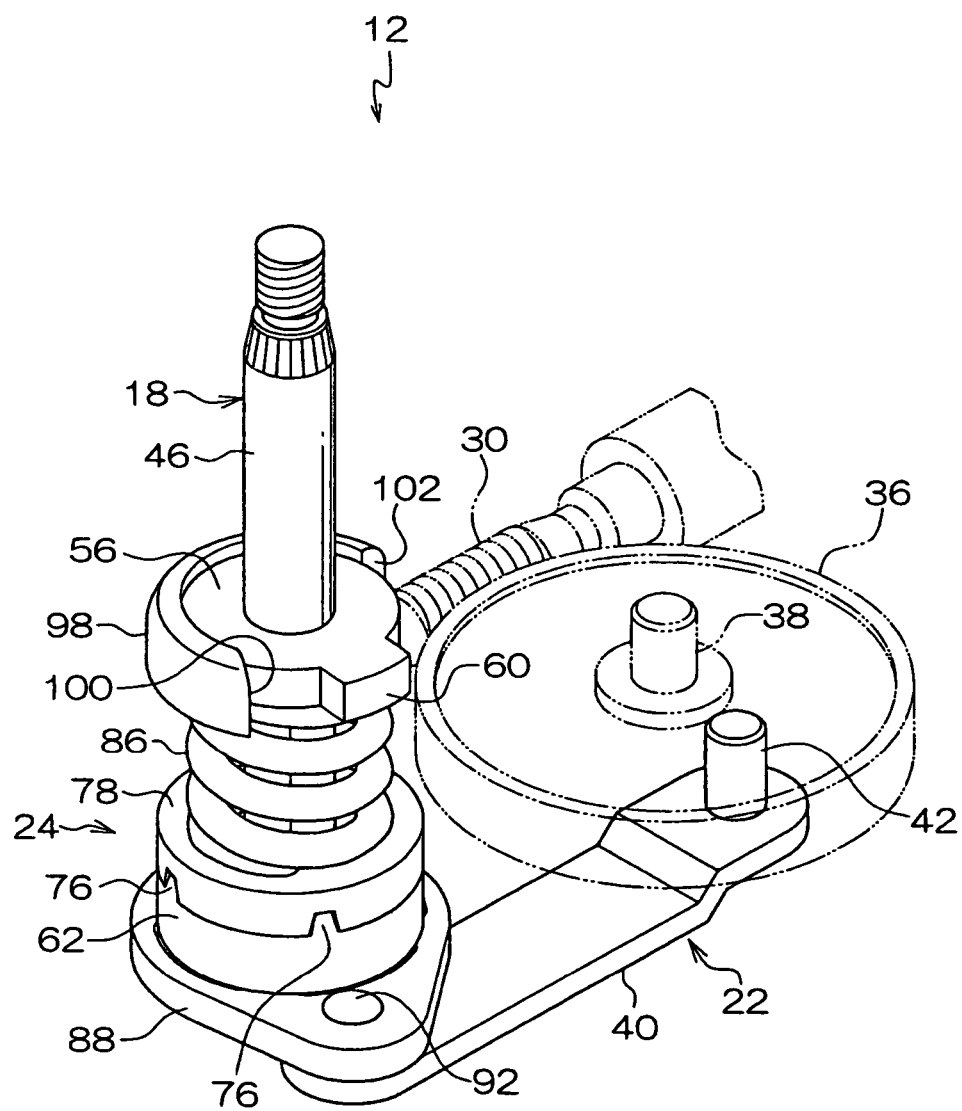
FIG. 13 is a perspective view showing structures of peripheral components, which include a swing mechanism and the clutch device in a coupled state serving as constituent members of the motor apparatus of the embodiment of the present invention.
Figure 14:
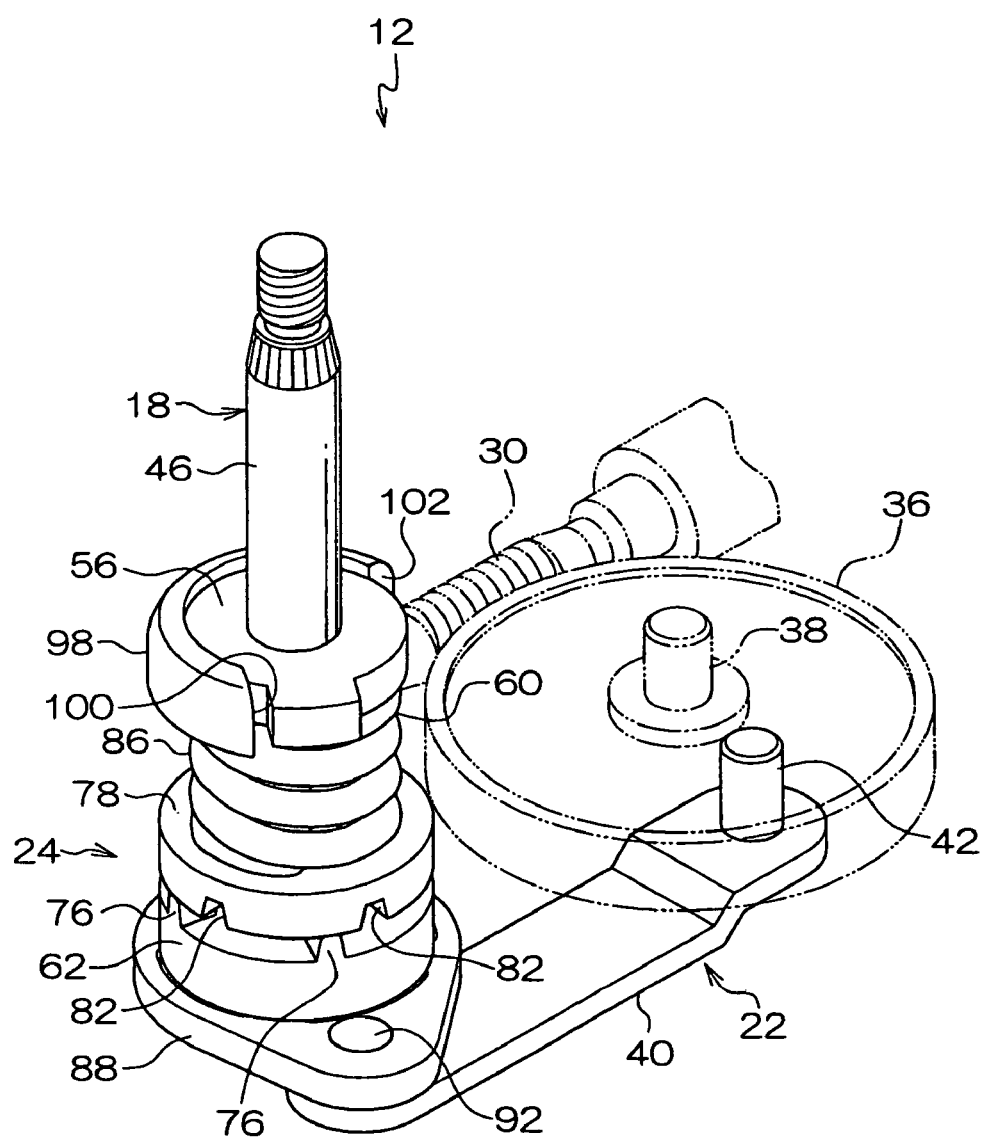
FIG. 14 is a perspective view showing structures of peripheral components, which include the swing mechanism and the clutch device in a declutched state serving as the constituent members of the motor apparatus of the embodiment of the present invention.

As shown in FIGS. 13 and 14, the stopper projection 98 is formed in the housing 26 to correspond with the stopper portion 60 of the engaging base 56.

The stopper projection 98 is formed to have an arcuate shape in a plane perpendicular to the direction of the axis B and is located in a rotational path of the stopper portion 60. Rotation limiters 100, 102 are arranged in opposed circumferential ends, respectively, of the stopper projection 98. Specifically, the rotation limiters 100, 102 of the stopper projection 98 are engageable with the stopper portion 60. When the stopper portion 60 is engaged with one of the rotation limiters 100, 102 of the stopper projection 98, further rotation of the engaging base 56 (the output shaft 18) is limited. Thus, when the engaging base 56 (the output shaft 18) is rotated together with the clutch disk 78 by the rotational drive force of the input disk 62, and the stopper portion 60 is engaged with one of the rotation limiters 100, 102, further rotation of the engaging base 56 (the output shaft 18) is forcefully limited. Therefore, relative rotation (racing) of the input disk 62 occurs.

Figure 15:
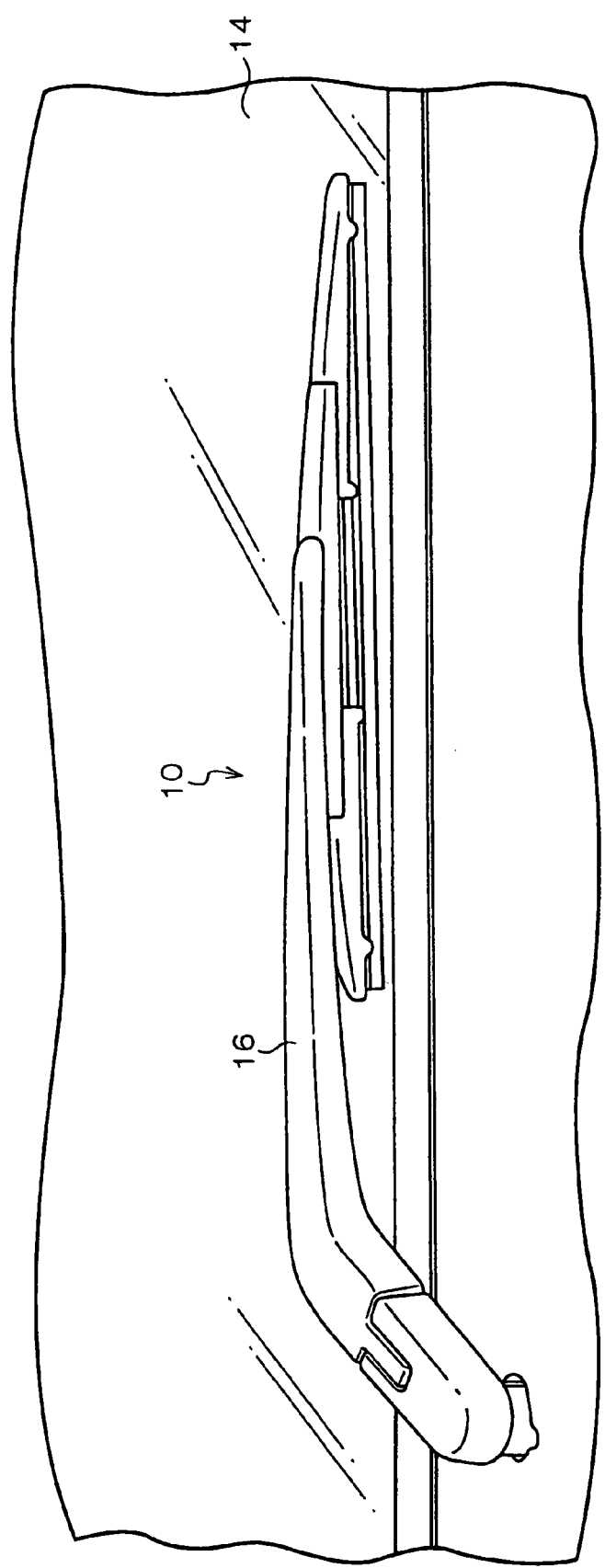
FIG. 15 is a perspective view showing a structure of a wiper apparatus according to the embodiment of the present invention.

The above wiper motor 12 is formed as the wiper driving motor apparatus for driving the wiper apparatus 10 of the vehicle shown in FIG. 15. The wiper apparatus 10 has the wiper(s) 16 for wiping a windshield glass (a window glass) 14 of the vehicle. The output shaft 18 of the wiper motor 12 (both not shown in FIG. 15) is directly connected to a base end (the left end in FIG. 15) of the wiper 16 or alternatively is indirectly connected to the base end of the wiper 16 through a linkage or a rod. When the output shaft 18 is reciprocally rotated, the wiper 16 is reciprocally swung.

Figure 16:
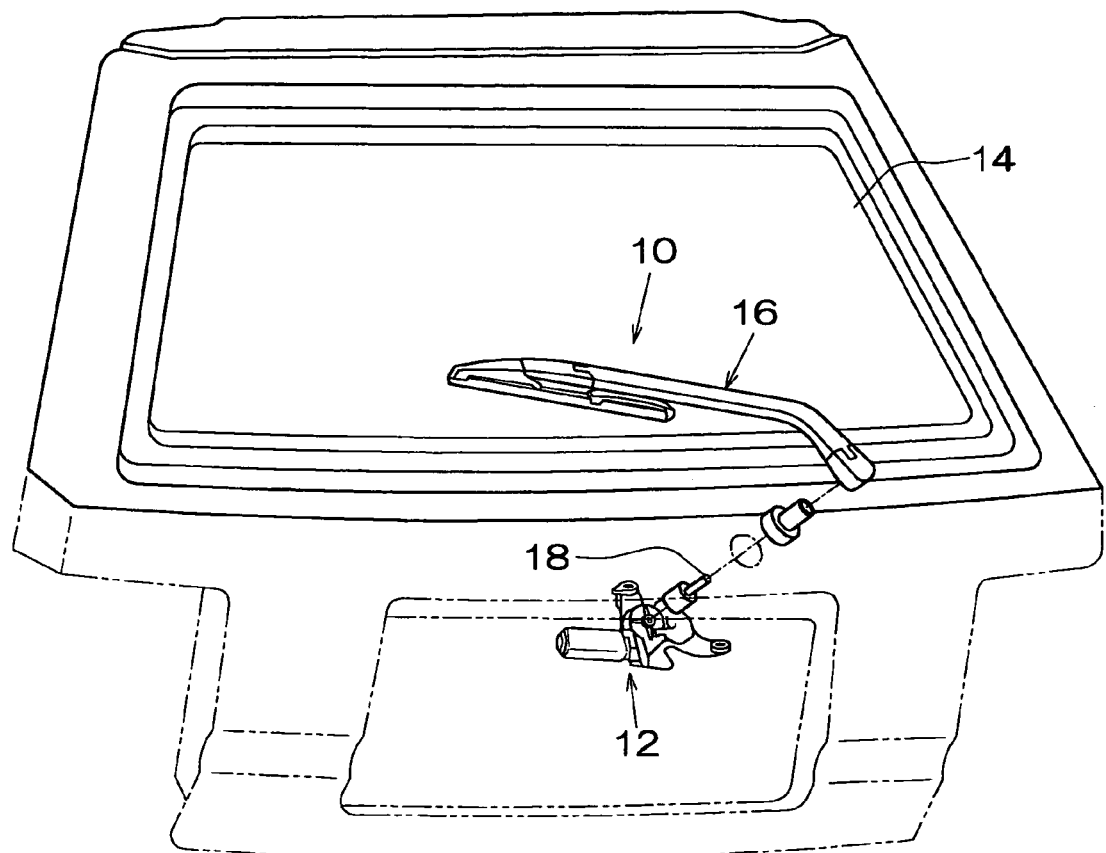
FIG. 16 is a partial exploded perspective view showing the wiper apparatus of the embodiment used as a rear wiper apparatus for wiping a rear window glass of a vehicle.

FIG. 16 shows an exploded perspective view of the wiper apparatus 10, which is provided as a rear wiper apparatus having the wiper motor 12. In FIG. 16, the wiper 16 is disconnected from the output shaft 18 of the wiper motor 12 to more clearly show the relationship between the wiper motor 12 and the wiper 16. Furthermore, although FIG. 16 shows the rear wiper apparatus, the present invention is not limited to the rear wiper apparatus. The wiper motor 12 of the present embodiment can be also used as a wiper motor of a front wiper apparatus.

Next, operation of the present embodiment will be described.

In the wiper motor 12, when the rotatable shaft 25 of the motor main body 20 is rotated, the rotational force is transmitted to the worm wheel 36 through the worm gear 30, so that the worm wheel 36 is rotated at the reduced speed. When the worm wheel 36 is rotated, the connecting rod 40, which has the one end connected to the worm wheel 36 by the support shaft 42 at the point displaced from the rotational center of the worm wheel 36 (the rotatable shaft 38), is reciprocally swung. The other end of the connecting rod 40 is connected to the one end of the rotatable lever 88 through the support shaft 92. Furthermore, the other end of the rotatable lever 88 is engaged with and is secured integrally with the gear teeth 68 of the input disk 62 of the clutch device 24, which is supported by the output shaft 18. Specifically, the four mating protrusions 96, which are formed in the inner peripheral surface of the receiving portion 94, are meshed with the gear teeth 68.

Thus, when the connecting rod 40 is reciprocally swung, the rotatable lever 88 is reciprocally rotated through a narrow angular range, which is less than 180 degrees (actually, the maximum of 120 degrees to allow reciprocal movement), and the input disk 62 is reciprocally rotated through the same angle as that of the rotatable lever 88 (a narrow angular range type).

In the normal operational state, as shown in FIGS. 6 and 13, the engaging projections 76 of the input disk 62 are meshed with, i.e., are engaged with the engaging recesses 82 of the clutch disk 78. Furthermore, when the clutch disk 78 tries to move in the direction of the axis B of the output shaft 18 from this engaged state where the engaging projections 76 are engaged with the engaging recesses 82, the predetermined resistive force is applied from the coil spring 86 to the clutch disk 78, so that the above engaged state is maintained. Furthermore, the clutch disk 78 is non-rotatable about the axis B relative to the output shaft 18. Thus, when the input disk 62 is reciprocally rotated, the rotational drive force is transmitted from the input disk 62 to the clutch disk 78 through the engaging projections 76 and the engaging recesses 82. Therefore, the output shaft 18 is reciprocally rotated together with the clutch disk 78 through the narrow angular range.

In this way, upon the reciprocal rotation of the output shaft 18, the wiper 16, which is connected to the output shaft 18, is reciprocally swung to wipe the windshield glass 14.

Figure 9:
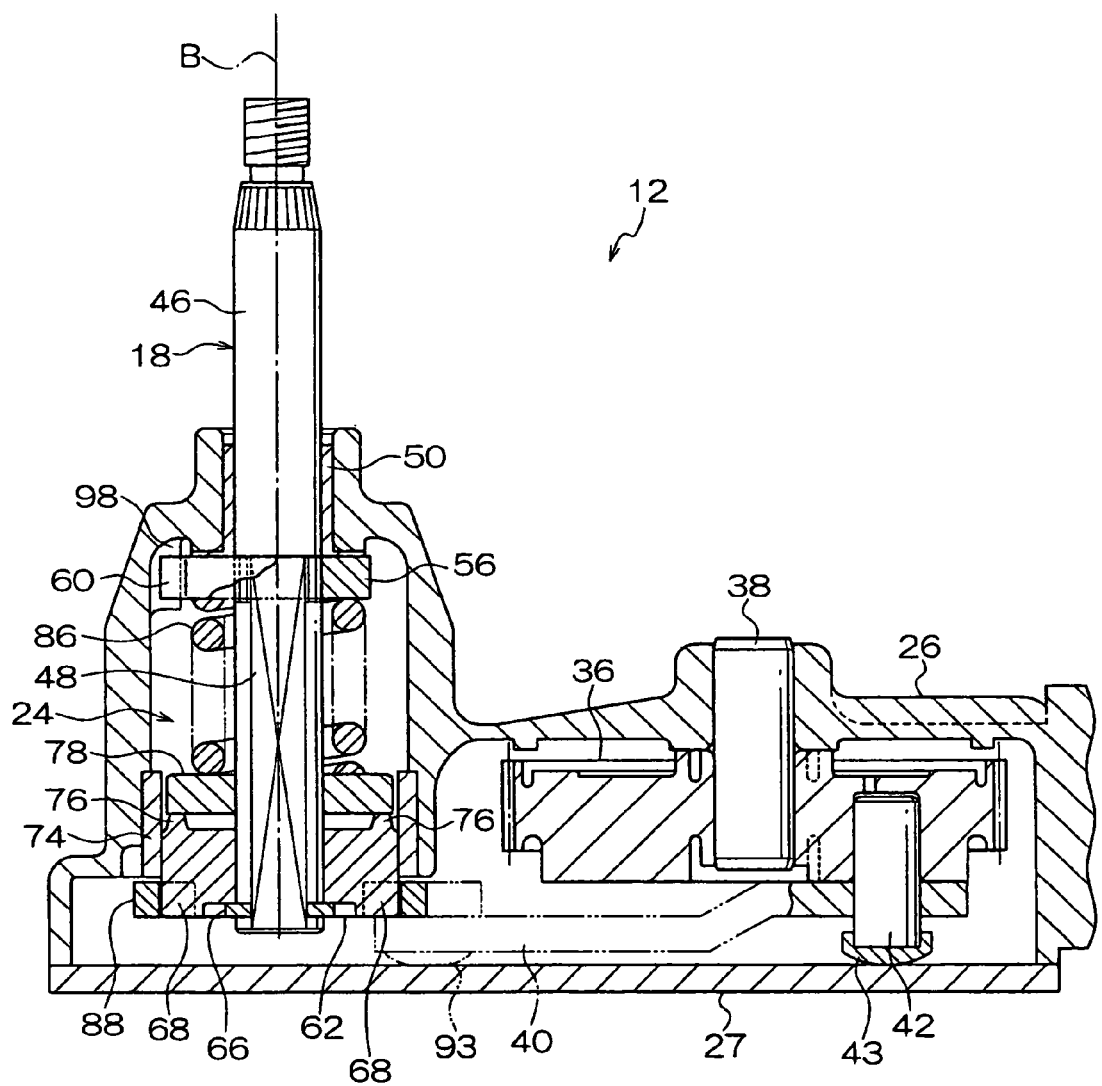
FIG. 9 is a view similar to FIG. 8, showing the structure of the motor apparatus of the embodiment of the present invention in a declutched state.

In contrast, when an excessive load torque is applied to the output shaft 18 through the wiper 16, the output shaft 18 is rotated in a reverse direction or is arrested. Then, the clutch disk 78, which is rotated integrally with the output shaft 18, receives a rotational force that causes relative rotation of the clutch disk 78 with respect to the input disk 62. Here, as described above, the lateral walls of the engaging projections 76 of the input disk 62 and the lateral walls of the engaging recesses 82 of the clutch disk 78 form the circumferentially slanted force component generating surfaces 84, which are slanted in the circumferential direction of the output shaft 18. In other words, each of the engaging projections 76 and the engaging recesses 82 has the corresponding trapezoidal cross section. Thus, the relative rotational force generated between the input disk 62 and the clutch disk 78 causes generation of the force component in the clutch disk 78 in the direction of the axis B of the output shaft 18 toward the engaging base 56. That is, the portion of the relative rotational force between the input disk 62 and the clutch disk 78 acts as the force component, which causes movement of the clutch disk 78 in the direction of the axis B of the output shaft 18 to release the engagement between the engaging projections 76 of the input disk 62 and the engaging recesses 82 of the clutch disk 78. When this relative rotational force (the force component) becomes equal to or greater than a predetermined value, the relative rotational force overcomes the resistive force applied from the coil spring 86, so that, as shown in FIGS. 9 and 14, the clutch disk 78 is forcefully moved in the direction of the axis B of the output shaft 18, and thereby the above engagement is released. Specifically, the engaging projections 76 of the input disk 62 are removed from the engaging recesses 82 of the clutch disk 78 to release the engagement therebetween. In this way, the clutch disk 78, i.e., the output shaft 18 is rotated relative to, i.e. raced relative to the input disk 62.

Thus, according to the wiper motor 12 of the present embodiment, in the state where the wiper 16 is frozen to the wiping surface in the normal stop position (the position of the wiper 16 in FIG. 15) in the rotational angular range or in the state where heavy snow is accumulated on the wiper 16 held in the normal stop position to arrest the wiper, when the motor main body 20 is rotated to apply excessively large load, the clutch device 24 is raced or is declutched. Also, during the operation of the wiper within the rotational angular range (the normal wiping range) of the wiper 16, when an excessively large force is applied to the output shaft 18 through the wiper 16, for example, when heavy snow accumulated on the roof of the vehicle falls along the windshield glass 14 onto the wiper 16, which is placed at a position other than the lower turning position at the time of wiping movement of the wiper 16, the clutch device 24 is raced or is declutched. Thus, it is possible to limit application of excessively large force to the drive force transmitting components (the components, such as the rotatable lever 88, the connecting rod 40, the worm wheel 36, the worm gear 30, the motor main body 20) located after the input disk 62. In this way, the respective components, which are located after the input disk 62, can be protected. Therefore, it is possible to limit the damage to such components and burnout of the motor main body 20.

Furthermore, it is only required to set the strength of each component located after the input disk 62 based on the rotation transmitting force (the declutching force) between the input disk 62 and the clutch disk 78. Thus, it is not required to set the excessive strength of each component upon consideration of the excessively large external force (load). As a result, manufacturing costs can be reduced.

Furthermore, the constituent members of the wiper apparatus 10 (the driven components, such as the wiper 16), which are connected to the output shaft 18, can be also protected since the racing of the clutch device 24 causes absorption of shocks applied to the constituent members of the wiper apparatus 10.

Furthermore, in the wiper motor 12 of the present embodiment, in the declutched state where the engagement between the engaging projections 76 of the input disk 62 and the engaging recesses 82 of the clutch disk 78 is released, when the stopper portion 60 of the engaging base 56 is engaged with the stopper projection 98 to forcefully limit the rotation of the engaging base 56, the rotation of the output shaft 18 and the clutch disk 78 are also limited. Therefore, the relative rotation (the racing) occurs between the input disk 62 and the clutch disk 78. When the engaging projections 76 and the engaging recesses 82 are placed in the predetermined position, the engagement between the engaging projections 76 and the engaging recesses 82 is possible, so that the clutch device 24 is returned to the coupled state. That is, even in the state where the clutch device 24 is declutched, when the motor main body 20 is rotated, the clutch device 24 can be automatically returned to its original position to couple the output shaft 18 (the wiper 16 that is indirectly connected to the output shaft 18) to the motor main body 20 side at the predetermined position to perform the normal drive operation.

Furthermore, in the wiper motor 12 of the present embodiment, the resistive force of the coil spring 86, which is applied against the axial movement of the clutch disk 78 to maintain the engaged state between the engaging projections 76 and the engaging recesses 82, is received by the engaging base 56, which is secured to the output shaft 18, and also by the input disk 62, which is supported in a manner that limits the removal of the input disk 62 from the output shaft 18 in the axial direction on the one axial side. That is, the two constituent components (the engaging base 56 and the input disk 62), which are installed to the output shaft 18, receive the force for maintaining the engaged state. Thus, the clutch device 24 of the wiper motor 12 is formed as a complete output shaft 18 assembly, which does not require any additional component, such as the housing 26. Therefore, the clutch device 24 can be handled as the single component, which is formed as the output shaft 18 assembly.

The wiper motor 12 of the present embodiment is formed as the narrow angular range type (the type in which the rotatable range of the output shaft 18 is limited to the maximum angle of 120 degrees). However, it should be noted that the gear teeth 68 are formed in the outer peripheral part of the input disk 62, which forms the part of the output shaft 18 assembly. Thus, in place of the rotatable lever 88 and the connecting rod 40, it is possible to use a swing member (e.g., a sector gear or a rack), which has gear teeth meshed with the gear teeth 68 of the input disk 62 at one end and which is connected to the worm wheel 36 at the other end at a point that is different from the rotational center of the worm wheel 36. In this way, the output shaft 18 assembly can be commonly used as a constituent component of a wiper motor of a wide angular range type (a wiper motor of a type, in which the output shaft is reciprocally rotated through a wider angular range). This will be described more specifically.

Figure 17:
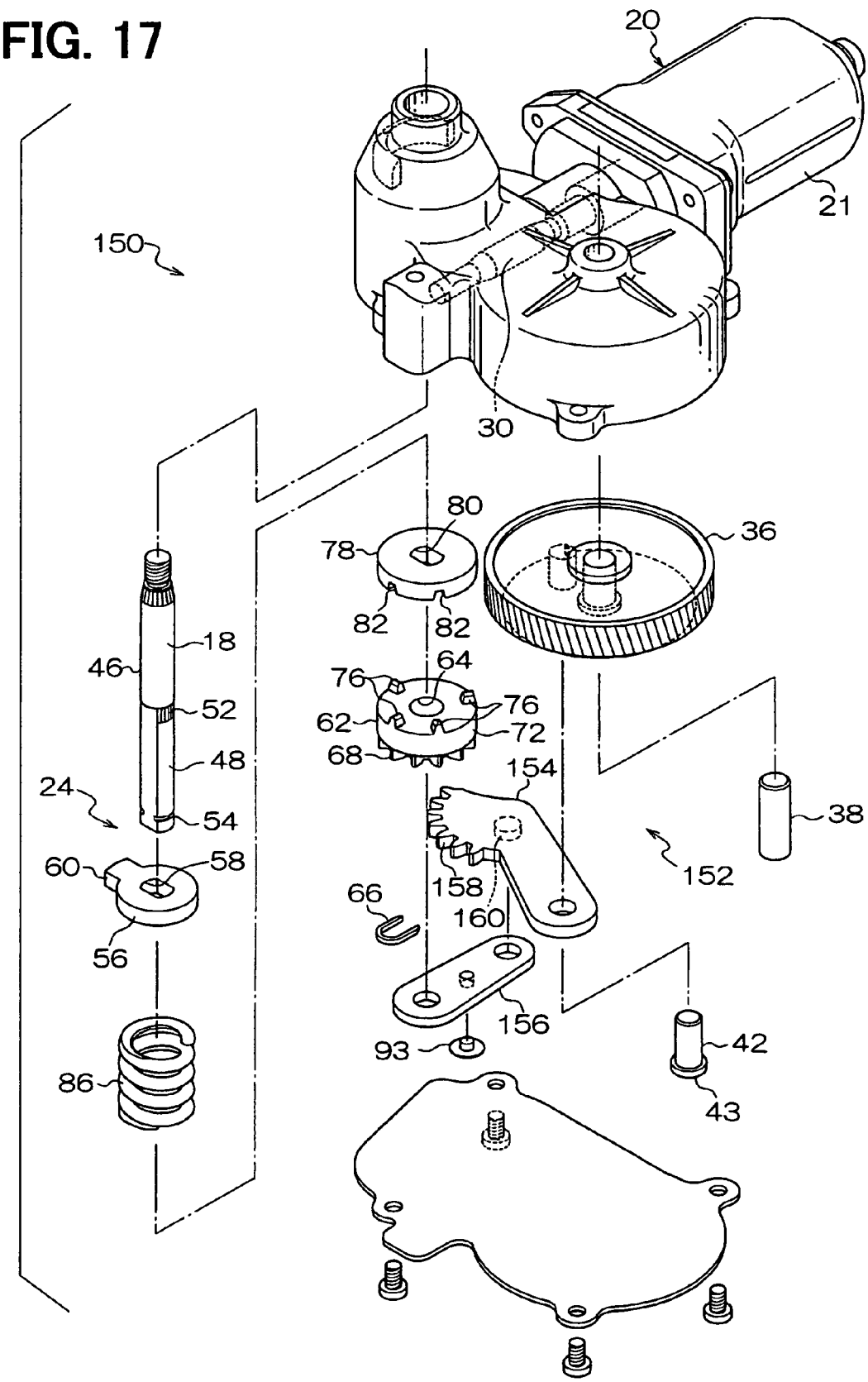
FIG. 17 is an exploded perspective view of a motor apparatus of a wide angular range type, which includes the output shaft and the clutch device serving as the constituent members of the motor apparatus of the embodiment of the present invention.
Figure 18:
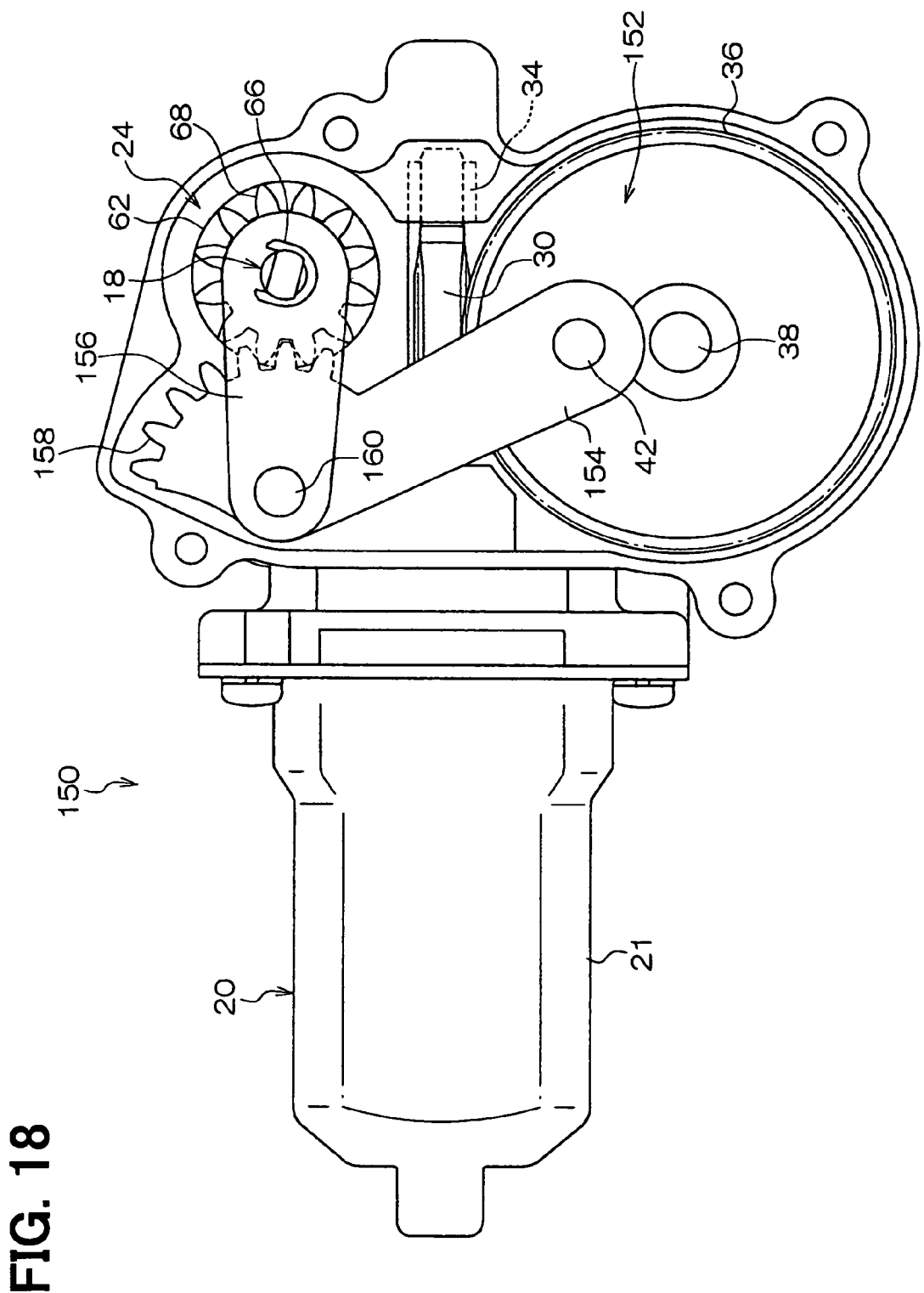
FIG. 18 is a rear view showing the structure of the motor apparatus shown in FIG. 17.

FIG. 17 is an exploded perspective view of the wiper motor 150 of the wide angular range type, in which the output shaft 18 assembly (the output shaft 18 and the clutch device 24 supported by the output shaft 18) of the wiper motor 12 of the above example, is applied. FIG. 18 is a rear view showing the structure of the wiper motor 150.

Hereinafter, components similar to those of the wiper motor 12 of the above example will be indicated by the same numerals and will not be described further for the sake of simplicity.

As shown in these drawings, the wiper motor 150 has the same basic structure as that of the wiper motor 12 of the above embodiment. However, in place of the rotatable lever 88 and the connecting rod 40 of the swing mechanism 22, the wiper motor 150 includes a sector gear 154 and a holding lever 156.

One end of the sector gear 154 is rotatably connected to the support shaft 42, which is placed at the point that is different from the rotational center of the worm wheel 36. The other end of the sector gear 154 includes gear teeth 158, which are meshed with the gear teeth 68 of the input disk 62.

The holding lever 156 is arranged on the other side (the side opposite from the worm wheel 36) of the sector gear 154 in the thickness direction of the sector gear 154. One end of the holding lever 156 is connected to a swing center shaft 160 of the gear teeth 158 (a support shaft located in a center of a pitch circle of the gear teeth 158). The other end of the holding lever 156 is rotatably connected to the output shaft 18. In this way, a shaft-to-shaft distance (an axis-to-axis pitch) between the swing center shaft 160 and the output shaft 18 is maintained, and the engagement between the sector gear 154 and the input disk 62 in the radial direction of the output shaft 18 is maintained. When the worm wheel 36 is rotated, the sector gear 154 is reciprocally swung. Then, the reciprocal swing movement of the sector gear 154 causes reciprocal rotation of the input disk 62.

In this wiper motor 150, the output shaft 18, which is reciprocally rotated together with the input disk 62 in the normal operational state, is reciprocally rotated through a wide angular range (possibly equal to or greater than 180 degrees), which is wider than that of the wiper motor 12 of the above embodiment at an increased speed due to a speed reducing ratio between the gear teeth 68 of the input disk 62 and the gear teeth 158 of the sector gear 154 (the wide type).

Figure 21:
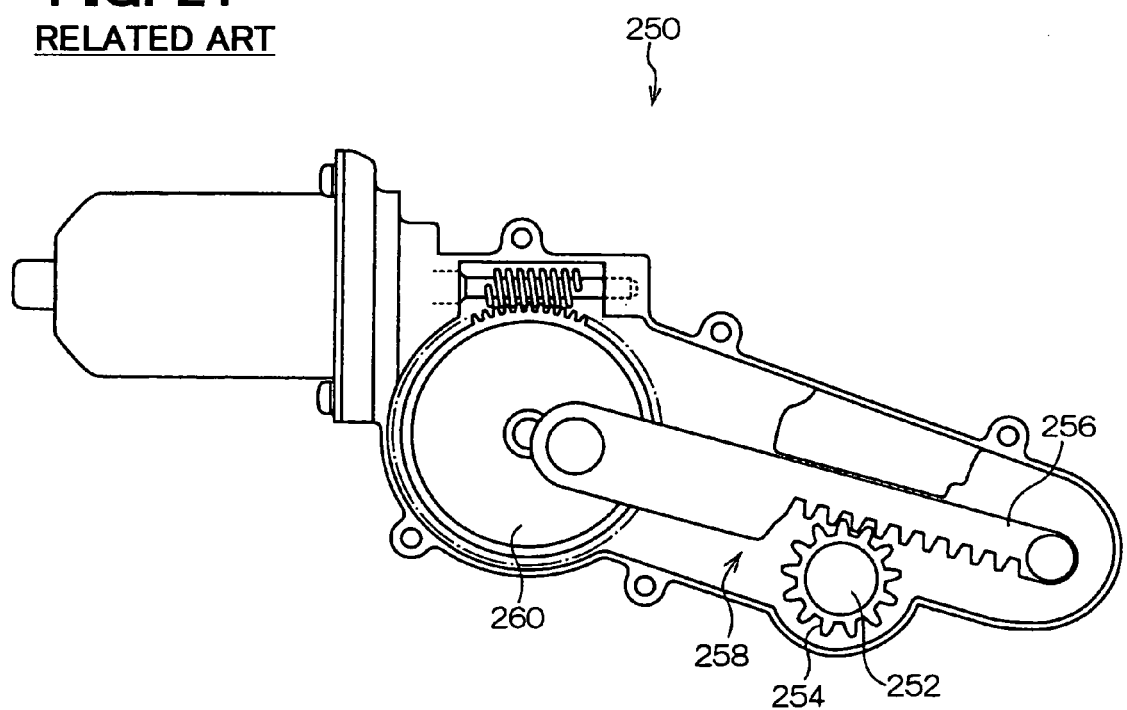
FIG. 21 is a plan view showing a structure of another motor apparatus of a wide angular range type.
Figure 22:
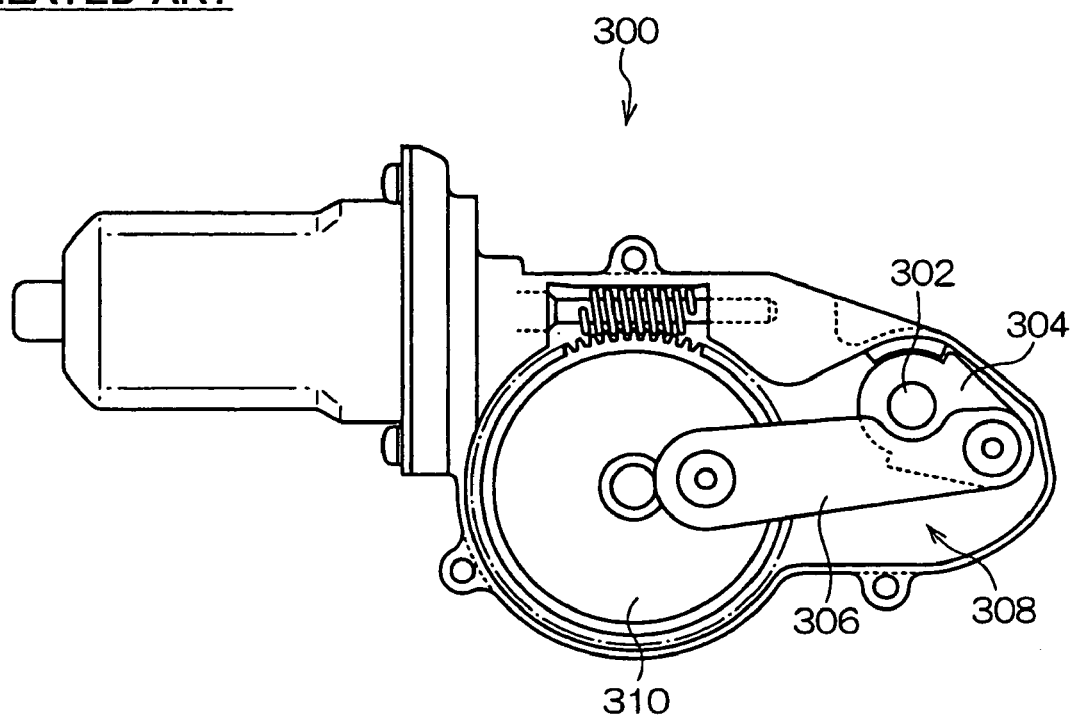
FIG. 22 is a plan view showing a structure of another motor apparatus of a narrow angular range type.

Also, with reference to FIG. 21, in the case of the wiper motor 250, in which the rack 256 is reciprocally moved, the gear teeth 68 of the input disk 62 of the output shaft 18 assembly of the above embodiment may be meshed with the rack 256. Thus, the output shaft 18 assembly can be also commonly used in the wiper motor 250.

As discussed above, in the case of the wiper motor 12 of the above embodiment, the output shaft 18 assembly (the output shaft 18 and the clutch device 24 supported by the output shaft 18) of the narrow angular range type can be commonly used as the output shaft assembly of the wiper motor 150 of the wide angular range type. In this way, both of the wiper motor 12 of the narrow angular range type and the wiper motor 150 of the wide angular range type can be obtained at the lower manufacturing costs.

Particularly, the input disk 62 and the clutch disk 78, which form the clutch device 24, receive the high contact pressure and require high manufacturing precision. Thus, it is desirable to form the input disk 62 and the clutch disk 78 from the sintered metal, as discussed in the above embodiment. However, in a case where the input disk 62 and the rotatable lever 88 are formed integrally from the sintered metal as a dedicated component of the wiper motor of the narrow angular range type, and the input disk 62 is used as a dedicated component of the wiper motor of the wide angular range type, these two different components are formed form the expensive sintered metal, so that the manufacturing costs are disadvantageously increased. With respect to this aspect, in the above embodiment, the input disk 62, which is made of the sintered metal, can be commonly used for both the wiper motor of the narrow angular range type and the wiper motor of the wide angular range type. Furthermore, the rotatable lever 88 is made as the inexpensive pressed product. Thus, the costs can be further reduced.

Figure 19:
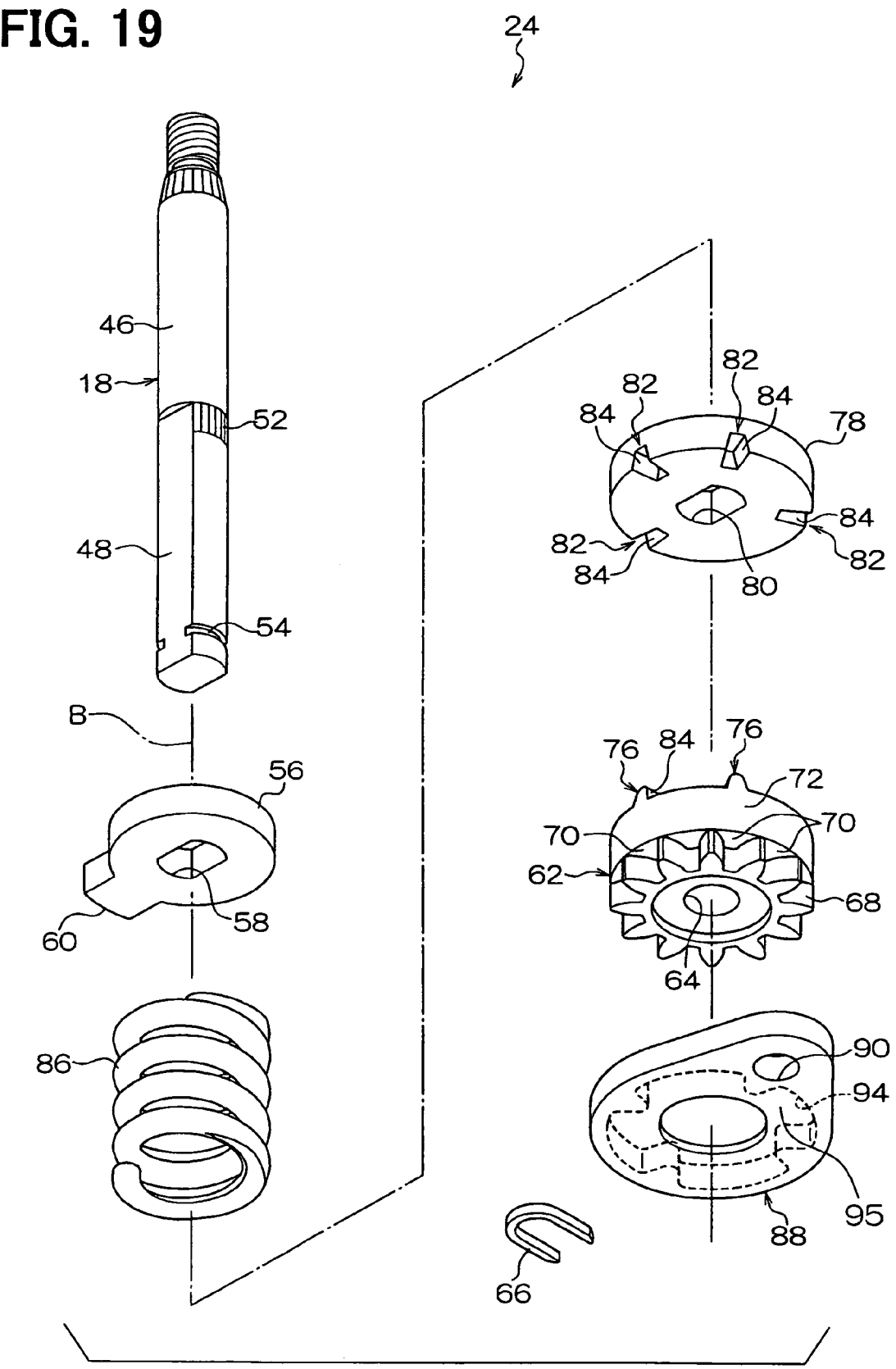
FIG. 19 is an exploded perspective view showing a modification of the rotatable lever of the wiper apparatus of the embodiment.

Furthermore, in the case of the wiper motor 12 of the above embodiment, the gear teeth 68 of the input disk 62 are meshed with the four mating protrusions 96, which protrude from the inner peripheral surface of the receiving portion 94 of the rotatable lever 88. Thus, the rotatable lever 88 is secured relative to the input disk 62 in such a manner that the rotation of the rotatable lever 88 relative to the input disk 62 about the axis B of the output shaft 18 is limited. Furthermore, the multiple (four) mating protrusions 96 are point symmetric with respect to the rotational center of the input disk 62. Thus, the rotatable lever 88 is secured in such a manner that the rotatable lever 88 is well balanced around the rotational center of the input disk 62, i.e., about the axis B of the output shaft 18, thereby achieving the stable securing strength. Furthermore, the outer peripheral part of the gear teeth 68 of the input disk 62 is received in the receiving portion 94 of the rotatable lever 88. Thus, it is possible to limit an increase in the dimension of the motor 12 in the direction of the axis B of the output shaft 18. Here, it should be understood that there is no need for the receiving portion of the rotatable lever to penetrate through the rotatable lever in the thickness direction of the rotatable lever (i.e., the receiving portion may be in a form of a bottomed recess). For example, as shown in FIG. 19, the receiving portion 94 may have a base wall part 95, which is axially opposed to the gear teeth 68 of the input disk 62 to cover the gear teeth 68. When the gear teeth 68 are covered by the base wall part 95, it is possible to limit protrusion of the gear teeth 68 beyond the wall thickness of the rotatable lever 88. Furthermore, when the base wall part 95 is engaged with an end surface (a lower end surface in FIG. 19) of the input disk 62, axial positioning of the input disk 62 relative to the rotatable lever 88 can be more precisely performed.

Furthermore, in the clutch device 24 of the wiper motor 12 of the above embodiment, the rotational force is transmitted from the input disk 62 to the clutch disk 78 when the engaging projections 76 of the input disk 62 are received in the engaging recesses 82, respectively, of the clutch disk 78, and the resistive force against the axial movement of the clutch disk 78 is applied from the coil spring 86 to the clutch disk 78. With this arrangement, the transmission of the drive force between the input disk 62 and the clutch disk 78 is reliably carried out. Also, the lateral walls of the engaging projections 76 of the input disk 62 and the lateral walls of the engaging recesses 82 of the clutch disk 78 form the circumferentially slanted force component generating surfaces 84, which are slanted in the circumferential direction of the output shaft 18. Thus, the above declutching force can be easily set based on the slant angle of each force component generating surface 84 and the resistive force (the resilient deformation force) of the coil spring 86.

Furthermore, in the case of the clutch device 24 of the wiper motor 12 of the above embodiment, the input disk 62 is decelerated and is reciprocally swung by the swing mechanism 22 (the worm gear 122, the worm wheel 128 and the sector gear 132). Thus, the output shaft 18 can be driven with the relatively large torque, and thereby the wiper 16, which is directly or indirectly connected to the output shaft 18, can be reciprocally driven in an appropriate manner.

Therefore, the wiper motor 12 of the above embodiment is also suitable as a wiper motor of a special vehicle, such as a truck or a constructor having a cab-over type cockpit, which will likely have an excessively large load on the output shaft 18 through the wiper 16 at the time of, for example, application of heavy snow, which is accumulated on a roof of the vehicle, to the wiper 16 and therefore to the wiper motor 12 upon vertical falling of the heavy snow along the glass surface.

As described above, in the case of the wiper motor 12 of the above embodiment, the output shaft 18 assembly for the narrow angular range type and the output shaft 18 assembly for the wide angular range type can be used as the common output shaft 18 assembly, which includes the clutch device 24, which can be commonly used for both of the narrow angular range type and the wide angular range type.

In the above embodiment, the clutch device 24 of the wiper motor 12 has the coil spring 86, which serves as the resilient member. However, the present invention is not limited to this. For example, the resilient member can be any other suitable member, such as a wave washer or a rubber member.

In the clutch device 24 of the wiper motor 12 of the above embodiment, the declutched state is achieved when the clutch disk 78 is moved in the direction of the axis B of the output shaft 18 against the resilient force of the coil spring 86. However, the preset invention is not limited to this. For example, the declutched state may be alternatively achieved when the input disk 62 is constructed to move relative to the clutch disk 78 in the direction of the axis B of the output shaft 18. However, in such a case, there is required a resilient member, which applies a resistive force against the movement of the input disk 62 in the direction of the axis B.

Furthermore, in the clutch device 24 of the wiper motor 12 of the above embodiment, the engaging projections 76 are formed in the input disk 62, and the engaging recesses 82 are formed in the clutch disk 78. However, the present invention is not limited to this construction. For example, the engaging recesses 82 may be alternatively formed in the input disk 62, and the engaging projections 76 may be alternatively formed in the clutch disk 78.

Figure 20:
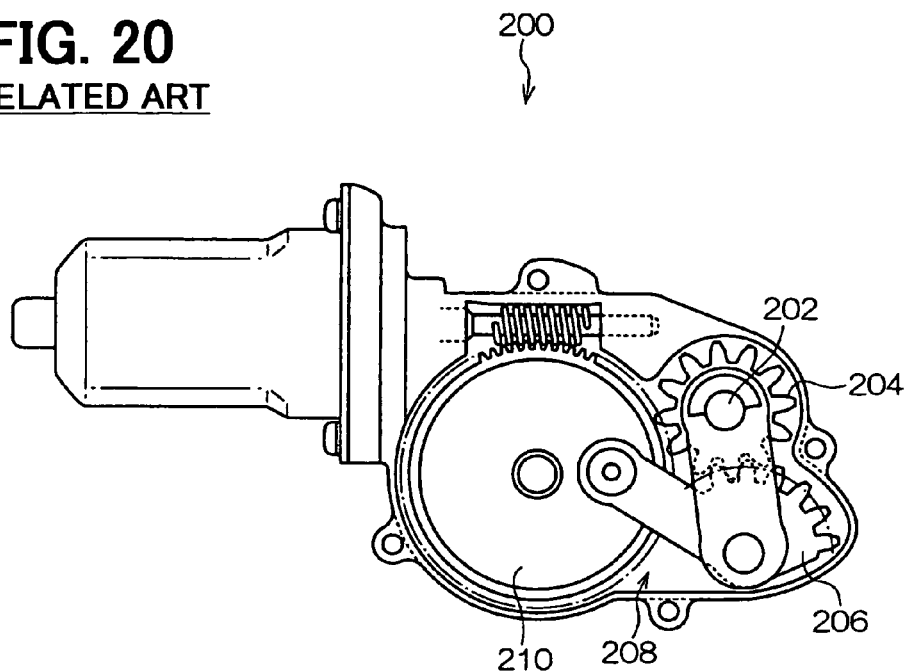
FIG. 20 is a plan view showing a structure of a motor apparatus of a wide angular range type.

Furthermore, the wiper motor 12 of the above embodiment includes the clutch device 24. However, the present invention is not limited to this. For example, the clutch device 24 of FIGS. 1 to 18 may be eliminated. In this case, the coil spring 86 and the clutch disk 78 may be eliminated, and the input disk 62 may be supported by the output shaft 18 in a non-rotatable manner relative to the output shaft 18 about the axis of the output shaft 18 like in a case of the gear 204, which is press fitted around the output shaft 202 of FIG. 20. More specifically, the input disk 62 having no engaging projections 76 may be press fitted around the output shaft 18 in a manner similar to that of the engaging base 56, which is press fitted to the rotation restraining portion 52 of the output shaft 18. Alternatively, the engaging base 56 and the input disk 62 may be formed integrally with the output shaft 18. In either case too, the output shaft 18 assembly (the output shaft 18 and the input disk 62) of the narrow angular range type can be commonly used as the output shaft assembly of the wide angular range type.

Furthermore, the motor of the present invention is not limited to the wiper motor and can be any other suitable motor (e.g., any other geared motor) used to drive any other device other than the wiper.

Additional advantages and modifications will readily occur to those skilled in the art. The invention in its broader terms is therefore not limited to the specific details, representative apparatus, and illustrative examples shown and described.

What is claimed is:

1. A motor apparatus comprising:
    a housing;
    an output shaft that is rotatably supported by the housing;
    a gear member that is supported by the output shaft in such a manner that the gear member is non-rotatable relative to the output shaft about an axis of the output shaft, wherein the gear member has gear teeth along an outer peripheral part of the gear member to receive a drive force;
    a rotatable body that is rotatably supported by the housing;
    a motor main body that provides a rotational drive force for rotating the rotatable body;
    a connecting rod that has a first end, which is connected to the rotatable body at a point that is different from a rotational center of the rotatable body, and a second end, which is opposite to the first end, wherein the connecting rod is reciprocally swung through rotation of the rotatable body; and
    a rotatable lever that has a first end, which is connected to the second end of the connecting rod, and a second end, which is engaged with and is secured integrally with the gear teeth of the gear member to limit relative rotation between the rotatable lever and the gear member, wherein the rotatable lever reciprocally rotates the gear member about the axis of the output shaft through reciprocal swinging movement of the connecting rod, wherein;
    the second end of the rotatable lever includes a receiving portion, which receives an outer peripheral part of the gear teeth of the gear member; and at least one mating protrusion is formed in an inner peripheral surface of the receiving portion and is meshed with the gear teeth of the gear member.

2. The motor apparatus according to claim 1, wherein the receiving portion has a base wall part, which is axially opposed to the gear teeth of the gear member to cover the gear teeth of the gear member.

3. The motor apparatus according to claim 1, wherein the at least one mating protrusion includes a plurality of mating protrusions, which are point symmetric with respect to the rotational center of the gear member.

4. The motor apparatus according to claim 1, wherein the rotatable body is a worm wheel, which is meshed with a worm gear and is rotated at a reduced speed, wherein the worm gear is provided to a rotatable shaft of the motor main body.

5. The motor apparatus according to claim 1, wherein the motor apparatus is a wiper motor of a wiper apparatus that has a wiper, which is directly or indirectly connected to the output shaft, so that the wiper is reciprocally driven by the wiper motor through the output shaft.

6. A motor apparatus comprising:
    a housing;
    an output shaft that is rotatably supported by the housing;
    a clutch device that includes:
    a gear member that is supported by the output shaft in such a manner that the gear member is rotatable relative to the output shaft about an axis of the output shaft, wherein the gear member has gear teeth along an outer peripheral part of the gear member to receive a drive force; and
    a clutch disk that is supported by the output shaft in such a manner that the clutch disk is non-rotatable relative to the output shaft about the axis of the output shaft, wherein:

the clutch disk is opposed to the gear member in an axial direction of the output shaft and is connected to the gear member in a manner that enables transmission of a drive force therebetween;

when a load torque equal to or greater than a predetermined value is exerted about the axis of the output shaft, relative rotation between the gear member and the clutch disk occurs;

a rotatable body that is rotatably supported by the housing;

a motor main body that provides a rotational drive force for rotating the rotatable body;

a connecting rod that has a first end, which is connected to the rotatable body at a point that is different from a rotational center of the rotatable body, and a second end, which is opposite to the first end, wherein the connecting rod is reciprocally swung through rotation of the rotatable body; and a rotatable lever that has a first end, which is connected to the second end of the connecting rod, and a second end, which is directly or indirectly engaged with and is secured integrally with the gear teeth of the gear member to limit relative rotation between the rotatable lever and the gear member, wherein the rotatable lever reciprocally rotates the gear member about the axis of the output shaft through reciprocal swinging movement of the connecting rod.

7. The motor apparatus according to claim 6, wherein:

one of the gear member and the clutch disk is supported by the output shaft in such a manner that the one of the gear member and the clutch disk is movable relative to the output shaft in the axial direction of the output shaft;

the clutch device further includes a resilient member, which applies a resistive force against axial movement of the one of the gear member and the clutch disk one of the gear member and the clutch disk includes at least one engaging projection that projects in the axial direction;

the other one of the gear member and the clutch disk includes at least one engaging recess that is recessed to engage with the at least one engaging projection;

each engaging projection has a force component generating surface; and each engaging recess has a force component generating surface, which engages the force component generating surface of a corresponding one of the at least one engaging projection in a circumferential direction of the output shaft to generate a force component in the axial direction of the output shaft.

8. The motor apparatus according to claim 6, wherein:

the second end of the rotatable lever includes a receiving portion, which receives an outer peripheral part of the gear teeth of the gear member; and at least one mating protrusion is formed in an inner peripheral surface of the receiving portion and is meshed with the gear teeth of the gear member.

9. The motor apparatus according to claim 8, wherein the receiving portion has a base wall part, which is axially opposed to the gear teeth of the gear member to cover the gear teeth of the gear member.

10. The motor apparatus according to claim 8, wherein the at least one mating protrusion includes a plurality of mating protrusions, which are point symmetric with respect to the rotational center of the gear member.

11. The motor apparatus according to claim 6, wherein the rotatable body is a worm wheel, which is meshed with a worm gear and is rotated at a reduced speed, wherein the worm gear is provided to a rotatable shaft of the motor main body.

12. The motor apparatus according to claim 6, wherein the motor apparatus is a wiper motor of a wiper apparatus that has a wiper, which is directly or indirectly connected to the output shaft, so that the wiper is reciprocally driven by the wiper motor through the output shaft.

* * * * *